(12) United States Patent
Bruno et al.

(10) Patent No.: US 12,722,784 B2
(45) Date of Patent: Sep. 1, 2026

(54) ENERGY FLOW OF AN ADVANCED ENVIRONMENTAL CONTROL SYSTEM

(71) Applicant: Hamilton Sundstrand Corporation, Charlotte, NC (US)

(72) Inventors: Louis J. Bruno, Ellington, CT (US); Harold W. Hipsky, Willington, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 18/659,390

(22) Filed: May 9, 2024

(65) Prior Publication Data

US 2024/0286745 A1 Aug. 29, 2024

Related U.S. Application Data

(62) Division of application No. 17/089,107, filed on Nov. 4, 2020, now Pat. No. 11,981,440, which is a division of application No. 15/604,526, filed on May 24, 2017, now Pat. No. 10,870,490.

(60) Provisional application No. 62/341,950, filed on May 26, 2016.

(51) Int. Cl.
*B64D 13/02* (2006.01)
*B64D 13/06* (2006.01)

(52) U.S. Cl.
CPC ...... *B64D 13/02* (2013.01); *B64D 2013/0618* (2013.01); *B64D 2013/0648* (2013.01)

(58) Field of Classification Search
CPC ............ B64D 13/02; B64D 2013/0618; B64D 2013/0648
See application file for complete search history.

(56) References Cited

U.S. PATENT DOCUMENTS

| | | | |
|---|---|---|---|
| 2,800,002 | A | 7/1957 | Seed |
| 2,909,323 | A | 10/1959 | Cholvin et al. |
| 2,930,205 | A | 3/1960 | Walker |
| 3,010,697 | A | 11/1961 | Lazo et al. |
| 3,137,477 | A | 6/1964 | Kofink |

(Continued)

FOREIGN PATENT DOCUMENTS

| | | | |
|---|---|---|---|
| CA | 2034371 | A1 | 10/1991 |
| CA | 2968745 | A1 | 11/2017 |

(Continued)

OTHER PUBLICATIONS

European Search Report Issued in European Application No. 17204787.0 dated Jun. 7, 2018; 7 Pages.

(Continued)

*Primary Examiner* — David J Teitelbaum
(74) *Attorney, Agent, or Firm* — CANTOR COLBURN LLP

(57) ABSTRACT

A compressing device includes a first turbine a second turbine and a compressor. The first turbine is configured to provide a first energy by expanding a first medium and the second turbine configured to provide a second energy by expanding a second medium. The compressor is configured to receive the first energy and the second energy during a first mode of the compressing device, receive the first energy during a second mode of the compressing device, and compress the second medium in accordance with the first mode or the second mode.

6 Claims, 13 Drawing Sheets

(56) References Cited

U.S. PATENT DOCUMENTS 3,177,676 A 4/1965 Abrahams
3,428,242 A 2/1969 Rannenberg
4,021,215 A 5/1977 Rosenbush et al.
4,261,416 A 4/1981 Hamamoto
4,283,924 A 8/1981 Schutze
4,374,469 A * 2/1983 Rannenberg ........... B64D 13/06 62/402
4,419,926 A 12/1983 Cronin et al.
4,546,939 A 10/1985 Cronin
4,604,028 A 8/1986 Yeaple et al.
4,875,345 A 10/1989 Signoret
5,014,518 A 5/1991 Thomson et al.
5,086,622 A 2/1992 Warner
5,125,597 A 6/1992 Coffinberry
5,136,837 A 8/1992 Davison
5,180,278 A 1/1993 Warner
5,299,763 A * 4/1994 Bescoby ................ B64D 13/06 454/70
5,461,882 A 10/1995 Zywiak
5,473,899 A 12/1995 Viteri
5,482,229 A 1/1996 Asshauer
5,704,218 A 1/1998 Christians et al.
5,709,103 A 1/1998 Williams
5,887,445 A 3/1999 Murry et al.
5,899,085 A 5/1999 Williams
5,911,388 A 6/1999 Severson
5,956,960 A 9/1999 Niggeman
5,967,461 A 10/1999 Farrington
6,058,725 A 5/2000 Monfraix et al.
6,070,418 A 6/2000 Crabtree et al.
6,128,909 A 10/2000 Jonqueres
6,189,324 B1 2/2001 Williams et al.
6,199,387 B1 3/2001 Sauterleute
6,216,981 B1 4/2001 Helm
6,257,003 B1 7/2001 Hipsky
6,283,410 B1 9/2001 Thompson
6,295,822 B1 10/2001 Mueller
6,505,474 B2 1/2003 Sauterleute et al.
6,519,969 B2 2/2003 Sauterleute
6,526,775 B1 3/2003 Asfia et al.
6,615,606 B2 9/2003 Zywiak
6,681,592 B1 * 1/2004 Lents ..................... B64D 13/06 62/401
6,776,002 B1 8/2004 Ho
6,845,630 B2 1/2005 Bruno et al.
6,848,261 B2 2/2005 Claeys
7,017,365 B2 3/2006 Haas et al.
7,059,136 B2 6/2006 Coffinberry
7,222,499 B2 5/2007 Hunt
7,380,749 B2 6/2008 Fucke et al.
7,607,318 B2 10/2009 Lui et al.
7,624,592 B2 12/2009 Lui et al.
7,673,459 B2 3/2010 Sheldon et al.
7,837,752 B2 11/2010 Darke et al.
7,845,188 B2 12/2010 Brutscher et al.
7,950,606 B2 5/2011 Atkey et al.
7,980,928 B2 7/2011 Markwart et al.
8,016,228 B2 9/2011 Fucke et al.
8,042,354 B1 10/2011 Dziorny et al.
8,099,973 B2 1/2012 Sampson et al.
8,302,407 B2 11/2012 Alecu et al.
8,303,384 B2 11/2012 Krakowski et al.
8,347,647 B2 1/2013 McAuliffe et al.
8,657,568 B2 2/2014 McAuliffe et al.
8,807,929 B2 8/2014 Koenigsegg
8,868,262 B2 10/2014 Haillot
8,985,966 B2 3/2015 Sampson et al.
9,085,365 B2 7/2015 Kelnhofer
9,103,568 B2 8/2015 Beers et al.
9,109,514 B2 8/2015 Cheong
9,151,218 B2 10/2015 Ebisu
9,169,024 B2 10/2015 Voinov
9,188,065 B2 11/2015 Dede et al.
9,205,925 B2 12/2015 Bruno et al.
9,211,954 B2 12/2015 Barkowsky
9,221,543 B2 12/2015 Kelnhofer
9,481,468 B1 11/2016 Schiff
9,487,300 B2 11/2016 Klimpel et al.
9,555,893 B2 1/2017 Squier
9,669,936 B1 6/2017 Fiterman et al.
9,849,990 B2 12/2017 Bruno
10,059,458 B2 8/2018 Squier
10,137,993 B2 11/2018 Bruno et al.
10,144,517 B2 12/2018 Bruno et al.
10,232,948 B2 3/2019 Bruno et al.
10,457,399 B2 10/2019 Bammann et al.
10,457,401 B2 10/2019 Feulner
10,486,817 B2 11/2019 Bruno et al.
10,597,162 B2 3/2020 Bruno et al.
10,604,263 B2 3/2020 Bruno et al.
10,683,803 B2 6/2020 Berti et al.
10,773,807 B2 9/2020 Hall et al.
10,870,490 B2 12/2020 Bruno et al.
10,953,992 B2 3/2021 Bruno et al.
11,047,237 B2 6/2021 Bruno et al.
11,506,121 B2 11/2022 Bruno et al.
2001/0004837 A1 6/2001 Sauterleute
2003/0051500 A1 3/2003 Asfia et al.
2003/0126880 A1 7/2003 Zywiak
2004/0014418 A1 1/2004 Farag et al.
2004/0014419 A1 1/2004 Lents et al.
2004/0014420 A1 * 1/2004 Bruno .................... B64D 13/06 454/237
2004/0055309 A1 3/2004 Bellows et al.
2004/0195447 A1 10/2004 Claeys
2005/0061911 A1 * 3/2005 Zywiak .................. B64D 13/06 60/767
2006/0059927 A1 3/2006 Zywiak et al.
2006/0059942 A1 3/2006 McAuliffe et al.
2006/0196216 A1 9/2006 Bruno et al.
2007/0111650 A1 5/2007 Lerche
2007/0266695 A1 11/2007 Lui et al.
2009/0117840 A1 5/2009 Kresser et al.
2009/0317248 A1 12/2009 Tanaka et al.
2010/0043794 A1 2/2010 Saito et al.
2010/0323601 A1 12/2010 Cremers et al.
2011/0036335 A1 2/2011 Wood et al.
2012/0114463 A1 5/2012 Beers et al.
2012/0118528 A1 5/2012 Al-Ali
2012/0156027 A1 6/2012 Merritt et al.
2013/0033348 A1 2/2013 Saito et al.
2013/0118190 A1 5/2013 Bruno et al.
2013/0136590 A1 5/2013 Higashimori et al.
2013/0187007 A1 7/2013 Mackin et al.
2014/0109603 A1 4/2014 Fernandes et al.
2014/0144163 A1 5/2014 Klimpel et al.
2014/0161698 A1 6/2014 Klimpel
2014/0238043 A1 8/2014 Sokhey et al.
2014/0250898 A1 9/2014 Mackin et al.
2014/0353461 A1 12/2014 Vignali et al.
2015/0013355 A1 1/2015 Klimpel et al.
2015/0033730 A1 2/2015 Beers et al.
2015/0065025 A1 3/2015 Bruno et al.
2015/0251765 A1 9/2015 Jonqueres et al.
2015/0251766 A1 9/2015 Atkey
2015/0275844 A1 10/2015 Winkler et al.
2015/0307195 A1 10/2015 Bruno
2015/0329210 A1 11/2015 Bammann et al.
2016/0083100 A1 3/2016 Bammann et al.
2016/0214727 A1 7/2016 Hamel et al.
2017/0021296 A1 1/2017 Paul et al.
2017/0129614 A1 5/2017 Bammann et al.
2017/0327235 A1 11/2017 Feulner
2017/0341759 A1 11/2017 Bruno et al.
2017/0341760 A1 11/2017 Hall et al.
2017/0341761 A1 11/2017 Bruno et al.
2017/0341764 A1 11/2017 Bruno et al.
2017/0341767 A1 11/2017 Bruno et al.
2017/0341768 A1 11/2017 Bruno et al.
2017/0342838 A1 11/2017 Bruno et al.
2017/0342899 A1 11/2017 Bruno et al.
2018/0051945 A1 2/2018 Hanov et al.
2018/0057175 A1 3/2018 Klimpel et al.
2018/0148179 A1 5/2018 Patent

(56) References Cited

U.S. PATENT DOCUMENTS

| | | | |
|---|---|---|---|
| 2018/0162536 | A1 | 6/2018 | Army et al. |
| 2019/0002110 | A1 | 1/2019 | Bruno et al. |
| 2019/0002111 | A1 | 1/2019 | Bruno et al. |
| 2020/0010202 | A1 | 1/2020 | Bammann et al. |
| 2020/0189749 | A1 | 6/2020 | Ho et al. |

FOREIGN PATENT DOCUMENTS

| | | | |
|---|---|---|---|
| CN | 1032857 | A | 5/1989 |
| CN | 101148197 | A | 3/2008 |
| CN | 101372260 | A | 2/2009 |
| CN | 101522522 | A | 9/2009 |
| CN | 101743166 | A | 6/2010 |
| CN | 102182490 | A | 9/2011 |
| CN | 103010466 | A | 4/2013 |
| CN | 104514636 | A | 4/2015 |
| CN | 105129095 | A | 12/2015 |
| CN | 107434048 | A | 12/2017 |
| CN | 107434044 | B | 12/2021 |
| CN | 107444655 | B | 6/2022 |
| CN | 107434047 | B | 7/2022 |
| CN | 107434045 | B | 5/2023 |
| EP | 0888966 | A2 | 1/1999 |
| EP | 1112930 | A2 | 7/2001 |
| EP | 1129941 | A2 | 9/2001 |
| EP | 1386837 | A1 | 2/2004 |
| EP | 2597036 | A2 | 5/2013 |
| EP | 2602191 | A1 | 6/2013 |
| EP | 2845804 | A1 | 3/2015 |
| EP | 2937287 | A1 | 10/2015 |
| EP | 2947012 | A1 | 11/2015 |
| EP | 3269645 | A3 | 3/2018 |
| EP | 3248881 | B1 | 8/2019 |
| EP | 3249196 | B1 | 12/2020 |
| EP | 3248879 | B1 | 6/2021 |
| EP | 3248877 | B1 | 5/2023 |
| EP | 3825531 | B1 | 5/2023 |
| GB | 2355520 | A | 4/2001 |
| JP | 5909163 | B2 | 4/2016 |
| WO | 03035472 | A1 | 5/2003 |
| WO | 2016004021 | A1 | 1/2016 |

OTHER PUBLICATIONS

European Search Report; European Application No. 22155723.4; Date: May 27, 2022; 20 pages.
Extended European Seacrh Report; International Application No. 20210933.6-1017; International Filing Date: Dec. 1, 2020; Date of Mailing: Apr. 29, 2021; 47 pages.
First Chinese Office Action; Appliation No. CN 201710384526.8; date of mailing Nov. 1, 2021 ; 6 pages.
First Chinese Office Action; Appliation No. CN 201710396154; date of mailing Sep. 13, 2021; 7 pages.
First Chinese Office Action; Appliation No. CN 201710411519.2; date of mailing Sep. 14, 2021; 4 pages.
First Chinese Office Action; Application No. 201710387280.X; Date of Mailing: Sep. 15, 2021; 6 pages.
First Chinese Office Action; Application No. CN 201710387279.7; date of mailing Sep. 13, 2021; 6 pages.
First Chinese Office Action; Appliation No. CN 201710387602.0; date of mailing Oct. 12, 2021; 15 pages.
First Chinese Office Action; Application No. CN 201710387603.5; date of mailing Oct. 12, 2021; 14 pages.
First Office Action; Chinese Application No. 201710382553.1; Date of Mailing: May 8, 2021; 6 pages.
First Office Action; Chinese Application No. 201710385862.4; International Filing Date: May 26, 2017; Date of Mailing: Apr. 16, 2021; 14 pages with translation.
First Office Action; Chinese Application No. 201710387590.1; Date of Mailing: Apr. 27, 2021; 10 pages.
First Office Action; Chinese Application No. 201710387601.6; Date of Mailing: Apr. 19, 2021; 8 pages.
Second Chinese Office Action; Appliation No. CN 201710384526.8; date of mailing Mar. 25, 2022 ; 7 pages.
Second Chinese Office Action; Appliation No. CN 201710385862.4; date of mailing Dec. 8, 2021 ; 13 pages.
Second Chinese Office Action; Appliation No. CN 201710387602.0; date of mailing Apr. 7, 2022; 10 pages.
Second Chinese Office Action; Application No. CN 201710387590.1; date of mailing Dec. 16, 2021 ; 17 pages.
Second Chinese Office Action; Application No. CN 201710387601.6; date of mailing Nov. 2, 2021 ; 8 pages.
Second Chinese Office Action; Application No. CN 201710411519.2; date of mailing Mar. 7, 2022; 12 pages.
U.S. Final Office Action; U.S. Appl. No. 15/604,440, filed May 24, 2017; Date of Mailing: Sep. 1, 2020; 21 pages.
U.S. Final Office Action; U.S. Appl. No. 15/604,481, filed May 24, 2017; Date of Mailing: May 29, 2020; 17 pages.
U.S. Non Final Office Action; U.S. Appl. No. 15/604,397, filed May 24, 2017; Date of Mailing: Mar. 24, 2020, 11 pages.
U.S. Non Final Office Action; U.S. Appl. No. 15/604,481, filed May 24, 2017; Date of Mailing: Feb. 5, 2020; 25 pages.
U.S. Non-Final Office Action; U.S. Appl. No. 15/604,397, filed May 24, 2017; Date of Mailing: Dec. 14, 2020; 19 pages.
U.S. NonFinal Office Action; U.S. Appl. No. 15/604,397, filed May 24, 2017; Date of Mailing Sep. 7, 2021; 23 pages.
Brazilian Office Action for Brazilian Application No. BR102017011080-0; Report Mail Date May 30, 2023 (6 Pages—With Machine Translation).
Brazilian Search Report and Written Opinion for Application No. BR102017010900-3, mailed Jan. 25, 2022, 4 pages.
Brazilian Search Report and Written Opinion for Application No. BR102017010903-8, mailed Jan. 25, 2022, 4 pages.
Brazilian Search Report and Written Opinion for Application No. BR102017011079-6, mailed Jan. 25, 2022, 4 pages.
Brazilian Search Report and Written Opinion for Application No. BR102017011080-0, mailed Jan. 25, 2022, 4 pages.
Brazilian Search Report and Written Opinion for Application No. BR102017011081-8, mailed Jan. 25, 2022, 4 pages.
Brazilian Search Report and Written Opinion for Application No. BR102017011083-4, mailed Jan. 25, 2022, 4 pages.
Brazilian Search Report and Written Opinion for Application No. BR102017011086-9, mailed Jan. 25, 2022, 4 pages.
Brazilian Search Report and Written Opinion for Application No. BR102017011087-7 mailed Jan. 25, 2022, 4 pages.
Brazilian Search Report and Written Opinion for Application No. BR102017011088-5, mailed Jan. 25, 2022, 4 pages.
Brazilian Search Report and Written Opinion for Application No. BR102017011090-7, mailed Jan. 25, 2022, 4 pages.
Brazilian Search Report and Written Opinion for Application No. BR102017011091-5, mailed Jan. 25, 2022, 4 pages.
Brazilian Written Opinion for Application No. BR102017010900-3, mailed Jan. 25, 2022, 2 pages (in English).
Brazilian Written Opinion for Application No. BR102017010903-8, mailed Jan. 25, 2022, 2 pages (in English).
Brazilian Written Opinion for Application No. BR102017011079-6, mailed Jan. 25, 2022, 2 pages (in English).
Brazilian Written Opinion for Application No. BR102017011080-0, mailed Jan. 25, 2022, 2 pages (in English).
Brazilian Written Opinion for Application No. BR102017011081-8, mailed Jan. 25, 2022, 2 pages (in English).
Brazilian Written Opinion for Application No. BR102017011083-4, mailed Jan. 25, 2022, 2 pages (in English).
Brazilian Written Opinion for Application No. BR102017011086-9, mailed Jan. 25, 2022, 2 pages (in English).
Brazilian Written Opinion for Application No. BR102017011087-7 mailed Jan. 25, 2022, 2 pages, (in English).
Brazilian Written Opinion for Application No. BR102017011088-5, mailed Jan. 25, 2022, 2 pages (in English).
Brazilian Written Opinion for Application No. BR102017011090-7 , mailed Jan. 25, 2022, 2 pages (in English).
Brazilian Written Opinion for Application No. BR102017011091-5, mailed Jan. 25, 2022, 2 pages (in English).
Canadian Office Action for Canadian Application No. 2,968,732; Report Mail Date Jul. 18, 2023 (4 Pages).

(56) References Cited

OTHER PUBLICATIONS

Canadian Office Action for Canadian Application No. 2,968,733; Report Mail Date Jul. 12, 2023 (4 Pages).
Canadian Office Action for Canadian Application No. 2,968,735; Report Mail Date Jul. 19, 2023 (4 Pages).
Canadian Office Action for Canadian Application No. 2,968,737; Report Mail Date Jun. 30, 2023 (4 Pages).
Canadian Office Action for Canadian Application No. 2,968,740; Report Mail Date Jul. 4, 2023 (4 Pages).
Canadian Office Action for Canadian Application No. 2,968,742; Report Mail Date Jul. 19, 2023 (4 Pages).
Canadian Office Action for Canadian Application No. 2,968,745; Report Mail Date Jul. 18, 2023 (4 Pages).
Canadian Office Action for Canadian Application No. 2,968,746; Report Mail Date Jul. 5, 2023 (4 Pages).
Canadian Office Action for Canadian Application No. 2,968,763; Report Mail Date Jul. 25, 2023 (4 Pages).
Chinese Office Action; Chinese Application No. 201710387603.5; Date: Apr. 12, 2022; 4 pages.
Communication from the European Patent Office for European Application No. 17172757.1; Date of Mailing: Apr. 9, 2020; 4 Pages.
Communication pursuant to Article 94(3) EPC; International Application No. 17172891.8-1010; International Filing Date: May 24, 2017; Date of Mailing: Feb. 9, 2021; 4 pages.
EPO Official Letter for Application No. 17204787.0, mailed May 6, 2021, 5 pages.
European Office Action for European Application No. 17172757.1 dated Nov. 30, 2018; 6 Pages.
European Office Action; European Application No. 17 172 822.3; Issued on Aug. 19, 2021; 5 pages.
European Office Action; European Application No. 17172757.1; Date of Mailing: Nov. 3, 2021; 7 pages.
European Office Action; European Application No. 17172816.5; Date of Mailing: Aug. 19, 2021; 5 pages.
European Office Action; International Application No. 17172757.1; dated Apr. 9, 2020; 4 pages.
European Office Action; International Application No. 17173077.3-1007; International Filing Date: May 26, 2017; Date of Mailing: Sep. 9, 2020; 6 pages.
European Search Report Issued in EP Application No. 17172830.6 dated Oct. 20, 2017; 9 Pages.
European Search Report Issued in European Application No. 17172757.1 dated Oct. 20, 2017; 10 Pages.
European Search Report Issued in European Application No. 17172822.3 dated Oct. 6, 2017; 8 Pages.
European Search Report Issued in European Application No. 17172834.8 dated Oct. 11, 2017; 10 Pages.
European Search Report Issued in European Application No. 17172889.2 dated Oct. 9, 2017; 10 Pages.
European Search Report Issued in European Application No. 17172891.8 dated Nov. 2, 2017; 9 Pages.
European Search Report Issued in European Application No. 17173043.5 dated Oct. 25, 2017; 9 Pages.
European Search Report Issued in European Application No. 17173077.3 dated Oct. 5, 2017; 9 Pages.
CA Office Action; Application No. 2,968,732; mailed Sep. 4, 2024; 4 pages.
CA Office Action; Application No. 2,968,733; mailed Aug. 23, 2024; 3 pages.
CA Office Action; Application No. 2,968,735; mailed Sep. 3, 2024; 3 pages.
CA Office Action; Application No. 2,968,745; mailed Sep. 9, 2024; 4 pages.
CA Office Action; Application No. 2,968,763, mailed Sep. 5, 2024; 4 pages.

* cited by examiner 100
105
116
104
V2
114
106
107
108
101
F1
103
F2
112
118
109
151
V1
113
M1
F3
164
162
M2
102

200
105
104
V2
114
106
107
108
112
113
118
210
209
101
F1
F1.2
103
F2
151
V1
M1
164
162
M2
F3
102
216
217
218
219

300
105
106
107
108
104
V2
114
112
113
101
F1
103
F2
118
210
309
316
317
318
319
151
V1
M1
164
162
M2
F3
102

500
105
106
107
108
104
101
103
102
151
162
164
112
413
415
217
216
218
219
118
510
509
F1
F1.2
F2
F3
V1
M2
M3

600
105
317
319
318
316
104
106
107
108
101
F1
103
F2
151
112
118
413
415
510
609
V1
M3
164
F3
162
M2
102

700
105
116
106
107
108
151
101
F1
103
F2
112
118
709
713
V1
104
V7
715
M5
164
F3
162
M2
102

800
105
106
107
108
151
V1
104
V7
F3
M5
164
162
M2
102
101
F1
F1.2
103
F2
112
118
713
715
810
809
216
217
218
219

900
105
106
107
108
151
V1
104
V7
112
713
715
118
810
909
316
317
318
319
101
F1
103
F2
F3
M5
164
162
M2
102

1000
151
105
1019
1017
1018
1016
V10
106
107
108
101
F1
103
F2
112
114
113
118
210
1009
104
M1
164
F3
162
102

1100
105
101
F1
106
107
108
V2
104
114
112
1113
116
118
1109
103
F2
F3
V11
151
M11
164
162
M2
102

1200
101
F1.2
105
104
V2
106
107
108
F1
114
112
1113
118
103
F2
1209
1210
217
219
218
216
V11
151
M11
164
162
M2
F3
102

1300
101
F1
105
106
107
108
104
V2
114
112
1113
118
1210
1309
103
F2
317
319
318
316
V11
151
M11
164
162
M2
F3
102

ENERGY FLOW OF AN ADVANCED ENVIRONMENTAL CONTROL SYSTEM

CROSS-REFERENCE TO RELATED APPLICATIONS

This application is a division of U.S. application Ser. No. 17/089,107 filed Nov. 4, 2020, which is a division of U.S. application Ser. No. 15/604,526 filed May 24, 2017, now issued U.S. Pat. No. 10,870,490, issue date Dec. 22, 2020, which claims the benefit of U.S. Provisional Application No. 62/341,950 filed May 26, 2016, the disclosures of which are incorporated herein by reference in their entirety.

BACKGROUND

In general, contemporary air condition systems are supplied a pressure at cruise that is approximately 30 psig to 35 psig. The trend in the aerospace industry today is towards systems with higher efficiency. One approach to improve airplane efficiency is to eliminate the bleed air entirely and use electrical power to compress outside air. A second approach is to use lower engine pressure. The third approach is to use the energy in the bleed air to compress outside air and bring it into the cabin.

BRIEF DESCRIPTION

According to one or more embodiments, a compressing device is provided. The compressing device comprises a turbine comprising a first inlet and a second inlet and configured to provide energy by expanding one or more mediums. The first inlet is configured to receive a first medium of the one or more mediums. The second inlet is configured to receive a second medium of the one or more mediums. The compressing device comprises a compressor configured to receive a first energy derived from the first and second mediums being expanded across the turbine during a first mode of the compressing device, receive a second energy derived from the first medium being expanded across the turbine during a second mode of the compressing device, and compress the second medium in accordance with the first mode or the second mode.

According to one or more embodiments or the above compressing device embodiment, the compressing device can comprise a fan configured to receive the first energy during the first mode and the second energy during the second mode.

According to one or more embodiments or any of the above compressing device embodiments, the compressing device can comprise a power turbine configured to provide a third energy by expanding a third medium of the one or more mediums, wherein the compressor is configured to receive the third energy from the third medium expanded across the power turbine.

According to one or more embodiments or any of the above compressing device embodiments, the compressing device can comprise a first component comprising the turbine and the compressor; and a second component, which is separate from the first component, comprising a fan, a second turbine, and a shaft.

According to one or more embodiments or any of the above compressing device embodiments, the fan can be driven via the shaft by the first medium expanding across the second turbine.

According to one or more embodiments or the airplane embodiment above, the compressing device can comprise a first component comprising the turbine and the compressor; and a second component, which is separate from the first component, comprising a fan driven by a motor.

According to one or more embodiments or any of the above compressing device embodiments, the first medium and the second medium can be mixed at the turbine during the first mode.

According to one or more embodiments or any of the above compressing device embodiments, the first medium and the second medium are mixed downstream of the turbine during the second mode.

According to one or more embodiments or any of the above compressing device embodiments, the first medium can be bleed air and the second medium can be fresh air.

According to one or more embodiments, an environmental control system of an aircraft can comprises any of the above compressing device embodiments.

According to one or more embodiments, a compressing device is provided. The compressing device comprises a first turbine configured to provide a first energy by expanding a first medium; a second turbine configured to provide a second energy by expanding a second medium; and a compressor. The compressor is configured to receive the first energy and the second energy during a first mode of the compressing device, receive the first energy during a second mode of the compressing device, and compress the second medium in accordance with the first mode or the second mode.

According to one or more embodiments or the above compressing device embodiment, the compressing device can comprise a fan configured to receive: the first energy and the second energy during the first mode, and the first energy during the second mode.

According to one or more embodiments or any of the above compressing device embodiments, the compressing device can comprise a first component comprising the first turbine, the second turbine, and the compressor; and a second component, which is separate from the first component, comprising a fan, a third turbine, and a shaft.

According to one or more embodiments or any of the above compressing device embodiments, the fan can be driven via the shaft by the first medium expanding across the second turbine.

According to one or more embodiments or any of the above compressing device embodiments, the compressing device can comprise a first component comprising the first turbine, the second turbine, and the compressor; and a second component, which is separate from the first component, comprising a fan driven by a motor.

According to one or more embodiments or any of the above compressing device embodiments, the second turbine can comprise a dual entry turbine configured to operate as a power turbine during a second mode by expanding a third medium to provide a third to the compressor.

According to one or more embodiments or any of the above compressing device embodiments, the compressing device can comprise a first component comprising the first turbine, the second turbine, and the compressor; and a second component, which is separate from the first component, comprising a fan, a third turbine, and a shaft.

According to one or more embodiments or any of the above compressing device embodiments, the compressing device can comprise a first component comprising the first turbine, the second turbine, and the compressor; and a second component, which is separate from the first component, comprising a fan driven by a motor.

According to one or more embodiments, a compressing device is provided. The compressing device comprises a first turbine configured to receive and expand a first medium; a second turbine configured to receive and expand a second medium; and a compressor. The compressor is configured to receive a first energy from the expansion of the first medium by the first turbine, and compress the second medium in the first energy; and a fan configured to receive a second energy from the expansion of the second medium by the second turbine.

According to one or more embodiments or the above compressing device embodiment, the compressing device can comprise a power turbine configured to provide a third energy by expanding a third medium, wherein the compressor is configured to receive the third energy from the third medium expanded across the power turbine.

According to one or more embodiments, a compressing device is provided. The compressing device comprises a turbine comprising a first inlet configured to receive a mixture of a first medium and a second medium and a second inlet configured to receive the first medium, wherein the turbine is configured to provide a first energy by expanding the mixture and to provide a second energy by expanding the first medium. The compressing device comprises a compressor configured to receive the first energy from the turbine during a first mode of the compressing device, receive the second energy from the first medium during a second mode of the compressing device, and compress the second medium in accordance with the first mode or the second mode.

According to one or more embodiments or the above compressing device embodiment, the compressing device can comprise a fan configured to receive the first energy during the first mode and the second energy during the second mode.

According to one or more embodiments or any of the above compressing device embodiments, the compressing device can comprise a power turbine configured to provide a third energy by expanding a third medium, wherein the compressor is configured to receive the third energy from the third medium expanded across the power turbine.

According to one or more embodiments or any of the above compressing device embodiments, the compressing device can comprise a first component comprising the turbine and the compressor; and a second component, which is separate from the first component, comprising a fan, a second turbine, and a shaft.

According to one or more embodiments or any of the above compressing device embodiments, the fan can be driven via the shaft by the first medium expanding across the second turbine.

According to one or more embodiments or any of the above compressing device embodiments, the compressing device can comprise a first component comprising the turbine and the compressor; and a second component, which is separate from the first component, comprising a fan driven by a motor.

Additional features and advantages are realized through the techniques of the embodiments herein. Other embodiments are described in detail herein and are considered a part of the claims. For a better understanding of the embodiments with the advantages and the features, refer to the description and to the drawings.

BRIEF DESCRIPTION OF THE DRAWINGS

The subject matter is particularly pointed out and distinctly claimed in the claims at the conclusion of the specification. The forgoing and other features, and advantages thereof are apparent from the following detailed description taken in conjunction with the accompanying drawings in which:

DETAILED DESCRIPTION

A detailed description of one or more embodiments of the disclosed apparatus and method are presented herein by way of exemplification and not limitation with reference to the FIGS.

Embodiments herein provide an environmental control system of an aircraft that mixes mediums from different sources and uses the different energy sources to power the environmental control system and to provide cabin pressurization and cooling at high fuel burn efficiency. The medium can generally be air, while other examples include gases, liquids, fluidized solids, or slurries.

Figure 1:
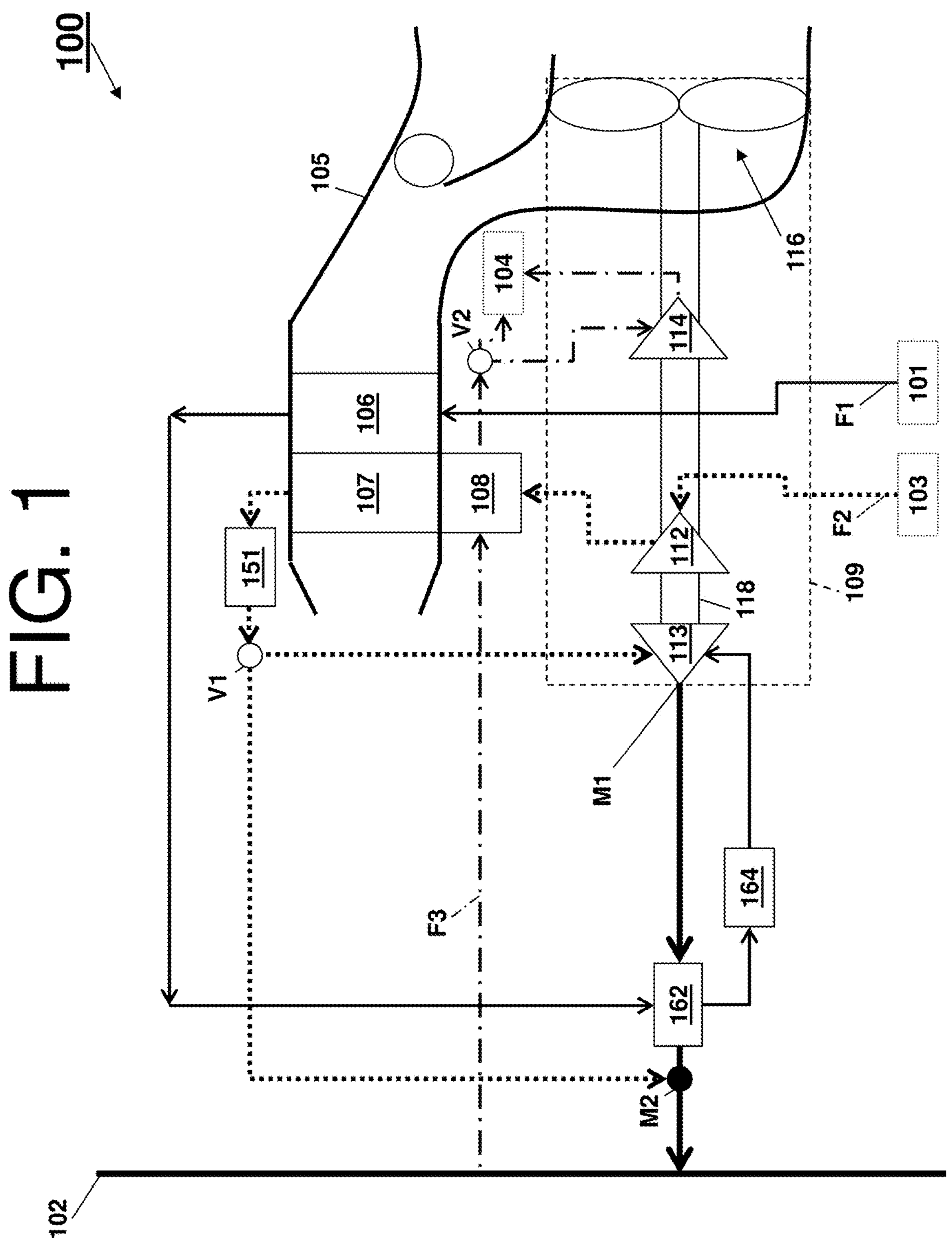
FIG. 1 is a diagram of a schematic of an environmental control system according to an embodiment.

Turning to FIG. 1, a schematic of an environmental control system is depicted according to a non-limiting embodiment (i.e., a system 100), as it could be installed on an aircraft. The aircraft example is not intended to be limiting, as alternative embodiments are contemplated As shown in FIG. 1, the system 100 can receive a first medium F1 from an inlet 101 and provide a conditioned form of the first medium F1, as indicated by thin-solid-lined arrows, which eventually is a portion of a mixed medium (described herein) provided to a volume 102. In view of the above aircraft embodiment, the first medium F1 can be bleed air, which is pressurized air supplied to or originating from (being "bled' from) an engine or auxiliary power unit of the aircraft. Note that temperature, humidity, and pressure of the bleed air can vary widely depending upon a compressor stage and revolutions per minute of the engine. Generally, the bleed air described herein is high-pressure air. The volume 102 can be pressurized air within an aircraft cabin or a combined flight deck and aircraft cabin. Generally, the pressurized air described herein is at a pressure that creates a safe and comfortable environment for humans on the aircraft.

The system 100 can receive a second medium F2 from an inlet 103 and provide a conditioned form of the second medium F2, as indicated by dotted-lined arrows, which eventually is a portion of the mixed medium provided to the volume 102. The second medium F2 can be fresh air, which can be outside air destined to enter the volume 102. The outside air can be procured by one or more scooping mechanisms, such as an impact scoop or a flush scoop. Thus, the inlet 103 can be considered a fresh air inlet or an outside air inlet. Generally, the fresh air described herein is at an ambient pressure outside of the aircraft with respect to altitude.

The system 100 can further receive a third medium F3 from the volume 102, as indicated by dot-dashed-lined arrows. The third medium F3 can be cabin discharge air, which can be air leaving the volume 102 and dumped/discharged overboard. For example, the cabin discharge air can be supplied to a destination, such as an outlet 104. Examples of the outlet 104 can include, but are not limited to, a ram circuit (which exhausts overboard) and/or an outflow valve (which exhausts overboard).

In accordance with non-limiting embodiments, the system 100 can perform or extract work from the cabin discharge air. In this way, the pressurized air of the volume can be utilized by the system 100 to achieve certain operations required at different altitudes. For instance, the system 100 can provide a conditioned form of the third medium F3 as a portion of the mixed medium provided to the volume 102 and/or other system (e.g., the aircraft cabin, the combined flight deck and aircraft cabin, a cabin pressure control system). In a non-limiting embodiment, the pressurized air can be resupplied to the volume 102. This resupplied pressurized air can be referred to as recirculation air (e.g., air that is recirculated inside the volume 102).

Thus, based on modes of operation, the system 100 can mix the first medium F1, the second medium F2, and/or the third medium F3 at the different mixing points within the system 100 to produce the mixed medium, as indicated by thick-solid-lined arrows. The mixed medium can be mixed air that meet fresh air requirements set by aviation organizations. The system 100 illustrates mixing point M1 and M2, which are not limiting.

The system 100 can comprise a ram circuit. The ram circuit comprises a shell 105 encasing one or more heat exchangers. The shell 105 can receive and direct a medium (such as ram air described herein) through the system 100. The one or more heat exchangers are devices built for efficient heat transfer from one medium to another. Examples of heat exchangers include double pipe, shell and tube, plate, plate and shell, adiabatic wheel, plate fin, pillow plate, and fluid heat exchangers.

The one or more heat exchangers encased by the shell 105 can be referred to as ram heat exchangers. Ram heat exchangers receive ram air, which can be outside air being forced through the shell 105, as a heat sink to cool bleed air (e.g., the first medium F1) and/or fresh air (e.g., the second medium F2). As shown in FIG. 1, the shell 105 comprises a primary heat exchanger 106 and a secondary heat exchanger 107. In a non-limiting embodiment, an exhaust of the cabin discharge air can be released through the shell 105 of the ram circuit and used in conjunction or in place of the ram air.

Also, as shown in FIG. 1, the system can include an outflow heat exchanger 108. In a non-limiting embodiment, an exhaust of the cabin discharge air (e.g., the third medium F3) can be released through the outflow valve (a.k.a. an outflow control valve and a thrust recovery outflow valve). For example, when the third medium F3 from the outflow heat exchanger 108 is coupled to the outflow valve, the outflow heat exchanger 108 increases the energy in the third medium F3, which increases the thrust recovered by the outflow valve. Note that the pressure drop at a high altitude between overboard and one of the inlet 101, the volume 102, and the inlet 103 can cause a corresponding medium to be pulled through the components of the system 100.

The system 100 can comprise a compressing device 109. The compressing device 109 can comprise a compressor 112, a turbine 113, a power turbine 114, a fan 116, and a shaft 118.

The compressing device 109 is a mechanical device that includes components for performing thermodynamic work on the medium (e.g., extracts or works on the first medium F1, the second medium F2, and/or the third medium F3 by raising and/or lowering pressure and by raising and/or lowering temperature). Examples of the compressing device 109 include an air cycle machine, a three-wheel air cycle machine, a four-wheel air cycle machine, etc.

The compressor 112 is a mechanical device that raises a pressure of a medium and can be driven by another mechanical device (e.g., a motor or a medium via a turbine). Examples of compressor types include centrifugal, diagonal or mixed-flow, axial-flow, reciprocating, ionic liquid piston, rotary screw, rotary vane, scroll, diaphragm, air bubble, etc. As shown in FIG. 1, the compressor 112 can receive and pressurize the second medium F2 from the inlet 103.

The turbine 113 and the power turbine 114 are mechanical devices that expand and extract work from a medium (also referred to as extracting energy). In the compressing device 109, the turbine drives the compressor 112 and the fan 116 via the shaft 118. The turbine 113 can be a dual entry turbine that includes a plurality of inlet gas flow paths, such as an inner flow path and an outer flow path, to enable mixing of alternative medium flows at the exit of the turbine. The inner flow path can be a first diameter, and the outer flow path can be a second diameter. The power turbine 114 can provide power assist to the turbine 113 based on the mode of operation the system (as described herein). In a non-limiting embodiment, the turbine 113 can comprise a first nozzle configured to accelerate the first medium for entry into a turbine impeller and a second nozzle is configured to accelerate the second medium for entry into the turbine impeller. The turbine impeller can be configured with a first gas path configured to receive the first medium from the first nozzle and with a second gas path configured to receive the second medium from the second nozzle.

The fan 116 (e.g., a ram air fan as shown in FIG. 1) is a mechanical device that can force via push or pull methods the medium (e.g., ram air) through the shell 105 across the heat exchangers 106 and 107 at a variable cooling to control temperatures.

The system 100 also comprises a water extractor 151, a condenser 162, and a water extractor 164. The water extractor 151 and the water extractor 164 are mechanical devices that perform a process of taking water from a medium. The condenser 160 is particular type of heat exchanger (another example includes a reheater). In a non-limiting embodiment, a condenser and/or a water extractor can combine to be a high pressure water separator that removes moisture at a highest pressure within an environmental control system (e.g., downstream of the primary heat exchanger 106). A low-pressure water separator removes moisture at a lowest pressure within an environmental control system, such as at a turbine discharge pressure (e.g., mixed air exiting the turbine 113).

The elements of the system 100 are connected via valves, tubes, pipes, and the like. Valves (e.g., flow regulation device or mass flow valve) are devices that regulate, direct, and/or control a flow of a medium by opening, closing, or partially obstructing various passageways within the tubes, pipes, etc. of the system 100. Valves can be operated by actuators, such that flow rates of the medium in any portion of the system 100 can be regulated to a desired value. For instance, a valve V1 controls whether a flow of the second medium F2 from the secondary heat exchanger 107 bypasses the condenser 162 in accordance with a mode of the system 100. Further, a valve V2 controls whether a flow of the third medium F3 from the volume 102 bypasses the power turbine 114 in accordance with a mode of the system 100. Note that a combination of components and elements of the system 100 can be referred to as an air conditioning pack or a pack. The pack can exist between the inlet 101, the volume 102, the inlet 103, the outlet 104, and an exhaust of the shell 105.

Operational embodiments of the system 100 of FIG. 1 will now be described with respect to an aircraft. The system 100 can be referred to as an advanced pneumatic system that mixes fresh air (e.g., the second medium F2) with bleed air (e.g., the first medium F1) to produce mixed air (e.g., the mixed medium) according to these operational embodiments. The (dual entry) turbine 113, the compressor 112, and the fan 116 can receive energy from the bleed air, the cabin discharge air (e.g., the third medium F3), and the fresh air. Operational embodiments can be described as modes or operational modes. A first mode, which can be used for ground and/or low altitude flight conditions (such as ground idle, taxi, take-off, and hold conditions), is a low altitude operation of the aircraft. A second mode, which can be used for high altitude flight conditions (such as high altitude cruise, climb, and descent flight conditions), is a high altitude operation of the aircraft.

When the system 100 is operating in the first mode (the low altitude operation of the aircraft), the compressor 112 receives energy from the bleed air via turbine 113 to compress the fresh air. The act of compressing the fresh air adds energy to the fresh air and that energy is also used to drive the compressor 112, in a bootstrapping effect, and the fan 116. Note that, in the first mode, the valve V2 directs the cabin discharge air to bypass the power turbine 114 and flow to the outlet 104, as the additional energy is not needed for compression.

For example, in the first mode, high-pressure high-temperature bleed air from either then the engine or the auxiliary power unit (e.g., the inlet 101) enters the primary heat exchanger 106. The primary heat exchanger 106 cools the high-pressure high-temperature bleed air to nearly ambient temperature to produce cool high-pressure bleed air. The cool high-pressure bleed air enters the condenser 162, where it is cooled (and dehumidified) to produce cold high-pressure bleed air. Note that the heat sink used by the condenser 162 can be the mixed air exhausting from the turbine 113 of the compressing device 109. The cold high-pressure bleed air flows through the water extractor 164, where moisture can be removed to produce cold dry high-pressure bleed air. Note that the combination of the condenser 162 and the water extractor 164 can be considered a high-pressure water extractor because bleed air received by the condenser 162 is at the highest pressure in the system 100. The cold dry high-pressure bleed air enters the turbine 113. The cold dry high-pressure bleed air enters the turbine 113 through a first nozzle, where it is expanded and work extracted.

The work extracted by the turbine 113 drives the compressor 112 used to compress the fresh air and drives the fan 116 used to move ram air through the ram air heat exchangers (e.g., the primary heat exchanger 106 and the secondary heat exchanger 107). The act of compressing the fresh air heats (and compresses) it to produce compressed fresh air, which is at a middle-pressure (i.e., medium-pressure fresh air). The medium-pressure fresh air enters the outflow heat exchanger 108 and is cooled by the cabin discharge air to produce cooled medium-pressure fresh air. The cooled medium-pressure fresh air enters the secondary heat exchanger 107, where it is further cooled to nearly ambient temperature to produce cool pressurized fresh air. The cool pressurized fresh air then enters the water extractor 151 where any free moisture in the cool pressurized fresh air is removed to produce dry cool pressurized fresh air. This dry cool pressurized fresh air is then directed by the valve V1 to the turbine 113. The dry cool pressurized fresh air enters the turbine 113 through a second nozzle, where it is expanded and work extracted.

The two air flows (i.e., the fresh air from the water extractor 151 and the bleed air from the water extractor 164) are mixed at the turbine 113 (e.g., at mixing point M1 as shown) to produce the mixed air. The mixed air leaves the turbine 113 and enters the condenser 162 (to cool the cool high-pressure bleed air leaving the primary heat exchanger 106 in the condenser 162). The mixed air is then sent to condition the volume 102.

When the system 100 is operating in the second mode (the high altitude operation of the aircraft), the system 100 can operate in a similar way as in the low altitude operation. For instance, the compressor 112 receives energy from the bleed air via turbine 113 to compress the fresh air. The act of compressing the fresh air adds energy to the fresh air. However, this energy is not enough to further drive the compressor 112. The compressor 112 then also receives energy from the cabin discharge air via the power turbine 114 (the valve V2 directs the third medium F3 to the power turbine 114), which used to increase an amount of the fresh air compressed in the compressor 112. Further, the dry cool pressurized fresh air exiting the water extractor 151 is also directed by the valve V1 to a mixing point M2 so that the fresh air is mixed downstream of the turbine 113 (rather than at it). Furthermore, in the second mode, fresh air requirements can be met by mixing the bleed air with fresh air, while an amount of bleed air can reduced by 40% to 75% depending on an altitude. In this way, the system 100 provides the bleed air reduction ranging from 40% to 75% to provide higher efficiencies with respect to engine fuel burn than contemporary airplane air systems.

Figure 2:
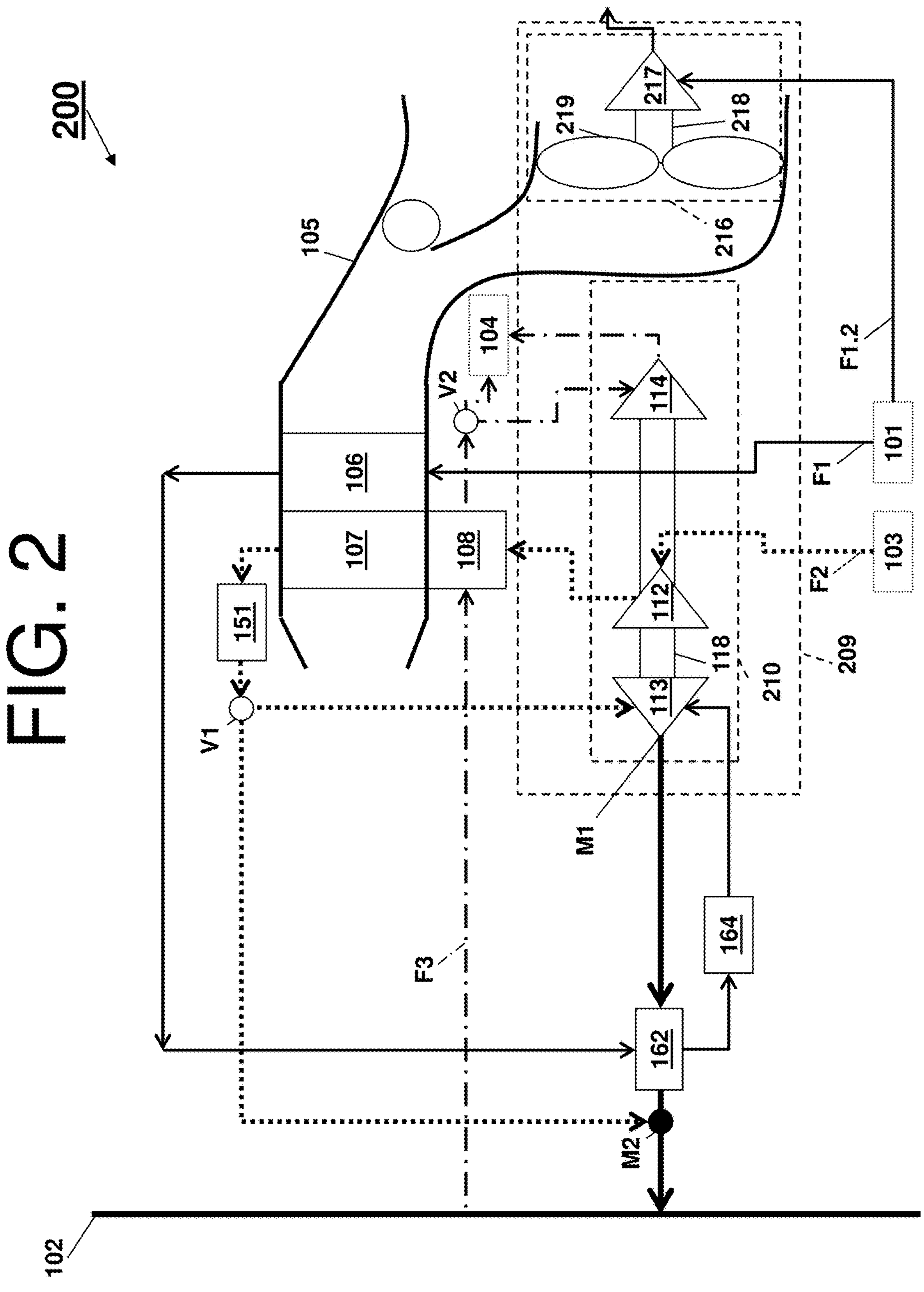
FIG. 2 is a diagram of a schematic of an environmental control system according to another embodiment.
Figure 3:
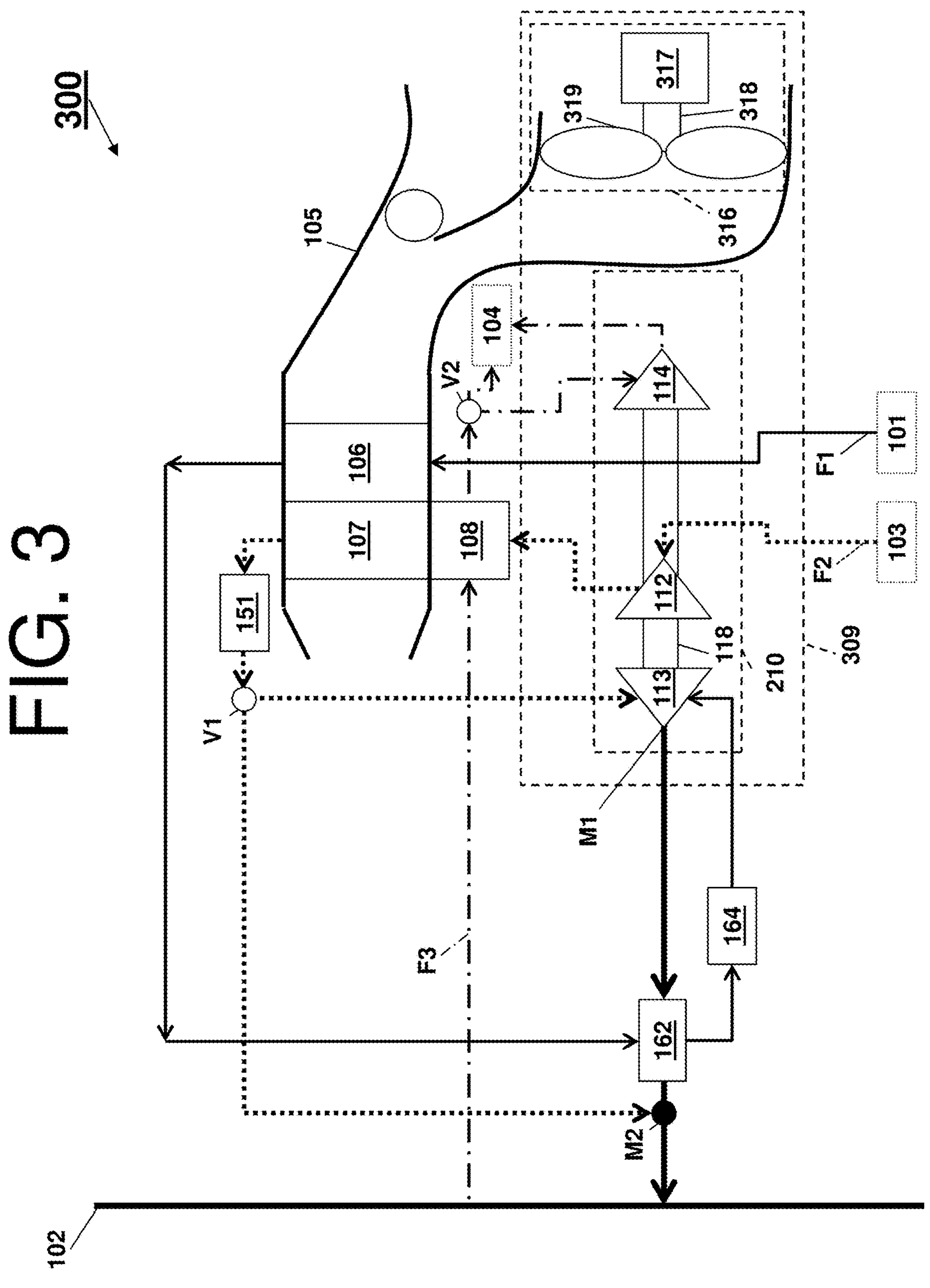
FIG. 3 is a diagram of a schematic of an environmental control system according to another embodiment.

Turning now to FIGS. 2 and 3, variations of the above system are shown as systems 200 and 300 according to non-limiting embodiments. Components of the above system that are similar to the systems 200 and 300 have been reused for ease of explanation, by using the same identifiers, and are not re-introduced. Note that, in these systems 200 and 300, the compressing device 109 is divided into multiple components, so that the fan 116 can be located on a second shaft and driven by a mechanism other than the compressor 112.

Turning now to FIG. 2, the system 200 is shown. Alternative and/or additional components of the system 200 include a compressing device 209 that comprises a component 210 and a component 216. The component 210 comprises the compressor 112, the turbine 113, and the power turbine 114 on the same shaft 118. The component 216 comprises a turbine 217, a shaft 218, and a fan 219. The turbine 217 of the component 216 is configured to receive a flow of a first medium F1.2 (e.g., bleed air) from the inlet

101, so that energy of the flow of the first medium F1.2 can be extracted by the turbine 217 and drive the fan 219 via the shaft 218.

When the system 200 is operating in the first mode (the low altitude operation of the aircraft), the compressor 112 receives energy from a first flow of the first medium F1 via turbine 113 to compress the second medium F2 (e.g., fresh air). The act of compressing the second medium F2 adds energy to the second medium F2 and that energy is also used to drive the compressor 112 in a bootstrapping effect. The fan 219 receives energy from the second flow of the first medium F1.2 passing through the turbine 217. Note that the pressure drop during the first mode between the inlet 101 and the exhaust of the turbine 215 can cause the second flow of the first medium F1.2 to be pulled through the turbine of the system 200.

When the system 200 is operating in the second mode (the high altitude operation of the aircraft), the compressor 112 receives energy from the first flow of the first medium F1 via turbine 113 to compress the second medium F2. The act of compressing the second medium F2 adds energy to the second medium F2; however, this energy is not enough to further drive the compressor 112. The compressor 112 then also receives energy from the third medium F3 via the power turbine 114 (the valve V2 directs the third medium F3 to the power turbine 114), which is used to increase an amount of the second medium F2 compressed in the compressor 112.

Turning now to FIG. 3, the system 300 is shown. Alternative and/or additional components of the system 300 include a compressing device 309 that comprises the component 210 and a component 316. The component 316 comprises a motor 317, a shaft 318, and a fan 319. The motor 317 of the component 316 can be configured to receive electric power, which enables the motor 316 to drive the fan 319 via the shaft 318.

When the system 300 is operating in the first mode (the low altitude operation of the aircraft), the compressor 112 receives energy from the first flow of the first medium F1 via turbine 113 to compress the second medium F2. The act of compressing the second medium F2 adds energy to the second medium F2 and that energy is also used to drive the compressor 112 in a bootstrapping effect. The fan 319 is driven by the motor 317.

When the system 300 is operating in the second mode (the high altitude operation of the aircraft), the compressor 112 receives energy from the first flow of the first medium F1 via turbine 113 to compress the second medium F2. The act of compressing the second medium F2 adds energy to the second medium F2; however, this energy is not enough to further drive the compressor 112. The compressor 112 then also receive energy from the third medium F3 via the power turbine 114 (the valve V2 directs the third medium F3 to the power turbine 114), which is used to increase an amount of the second medium F2 compressed in the compressor 112.

Figure 4:
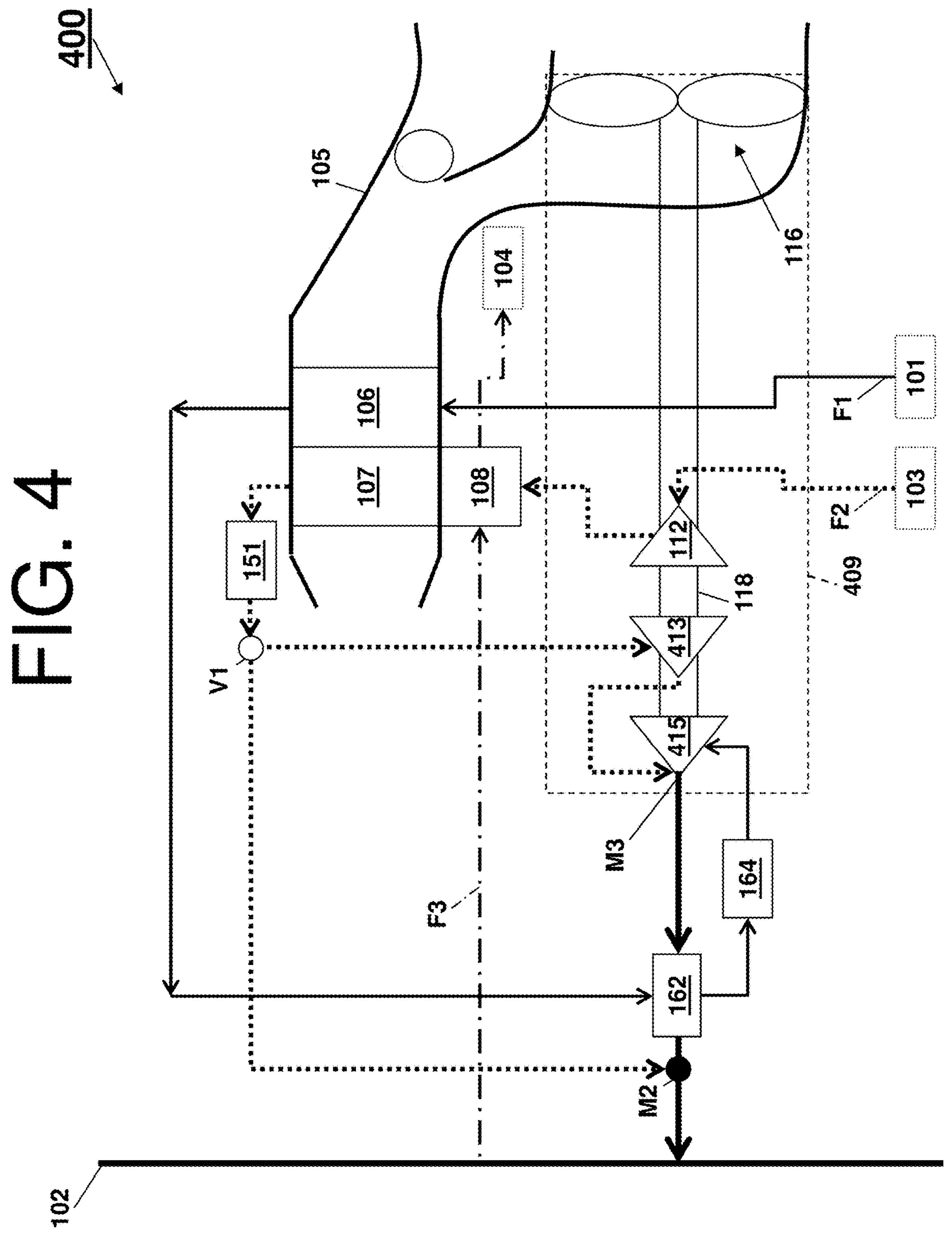
FIG. 4 is a diagram of a schematic of an environmental control system according to another embodiment.
Figure 5:
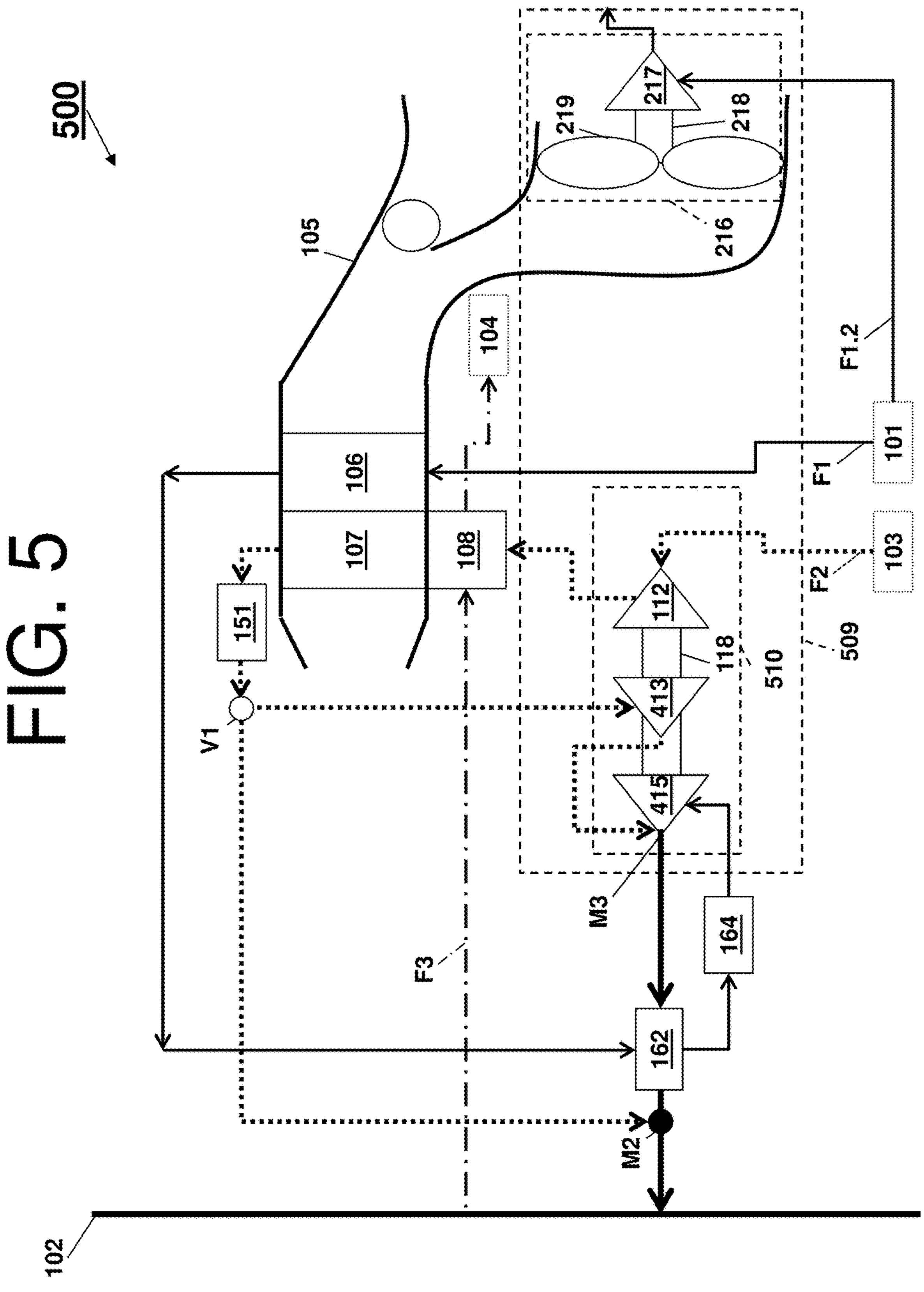
FIG. 5 is a diagram of a schematic of an environmental control system according to another embodiment.
Figure 6:
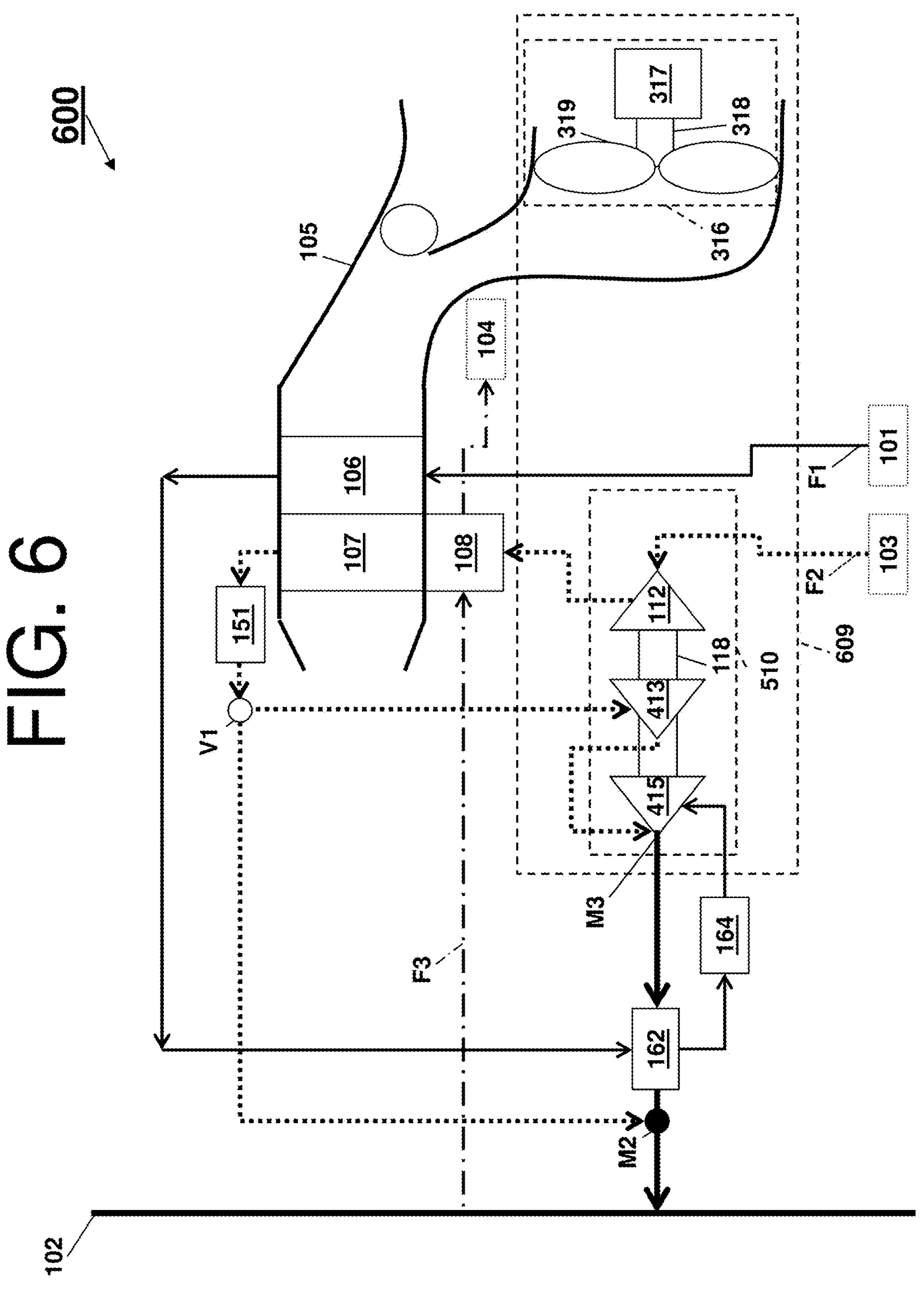
FIG. 6 is a diagram of a schematic of an environmental control system according to another embodiment.

Turning now to FIGS. 4, 5, and 6, variations of the above systems are shown as systems 400, 500, and 600 according to non-limiting embodiments. Components of the above systems that are similar to the systems 400, 500, and 600 have been reused for ease of explanation, by using the same identifiers, and are not re-introduced.

With respect to FIG. 4, the system 400 is shown. Alternative and/or additional components of the system 400 include a compressing device 409 that additionally comprises dual use turbines 413 and 415, along with a mixing point M3. The dual use turbines 413 and 415, the compressor 112, and the fan 116 can receive energy from the first medium F1 (e.g., bleed air) and the second medium F2 (e.g., fresh air).

When the system 400 is operating in the first mode (the low altitude operation of the aircraft), the compressor 112 and the fan 116 receive energy from the bleed air via turbine 415 and energy from the fresh air via the turbine 413. The energy received by the compressor 112 is utilized to compress the fresh air. The act of compressing the fresh air adds energy to the fresh air and that energy is also used to drive the compressor 112, in a bootstrapping effect, and the fan 116.

For example, in the first mode, high-pressure high-temperature bleed air from either then the engine or the auxiliary power unit (e.g., the inlet 101) enters the primary heat exchanger 106. The primary heat exchanger 106 cools the high-pressure high-temperature bleed air to nearly ambient temperature to produce cool high-pressure bleed air. The cool high-pressure bleed air enters the condenser 162, where it is cooled (and dehumidified) to produce cold high-pressure bleed air. Note that the heat sink used by the condenser 162 can be the mixed air exhausting from the compressing device 409. The cold high-pressure bleed air flows through the water extractor 164, where moisture can be removed to produce cold dry high-pressure bleed air. Note that the combination of the condenser 162 and the water extractor 164 can be considered a high-pressure water extractor because bleed air received by the condenser 162 is at the highest pressure in the system 100. The cold dry high-pressure bleed air enters the turbine 415. The cold dry high-pressure bleed air enters the turbine 415, where it is expanded and work extracted.

The work extracted by the turbine 415 drives the compressor 112 used to compress fresh air and drives the fan 116 used to move ram air through the ram air heat exchangers (e.g., the primary heat exchanger 106 and the secondary heat exchanger 107). The act of compressing the fresh air heats (and compresses) it to produce compressed fresh air, which is at a middle-pressure (i.e., medium-pressure fresh air). The medium-pressure fresh air enters the outflow heat exchanger 108 and is cooled by the cabin discharge air (e.g., the third medium F3) to produce cooled medium-pressure fresh air. The cooled medium-pressure fresh air enters the secondary heat exchanger 107, where it is further cooled to nearly ambient temperature to produce cooled pressurized fresh air. The cooled pressurized fresh air then enters the water extractor 151 where any free moisture in the cooled pressurized fresh air is removed to produce dry cooled pressurized fresh air. This dry cooled pressurized fresh air is then directed by the valve V1 to the turbine 413. The dry cooled pressurized fresh air enters the turbine 413, where it is expanded and work extracted.

The two air flows (i.e., the fresh air from the turbine 413 and the bleed air from the turbine 415) are mixed to produce the mixed air. The mixing can be at the turbine 415 (e.g., at mixing point M3 as shown). The mixed air enters the condenser 162 (to cool the cool high-pressure bleed air leaving the primary heat exchanger 106 in the condenser 162). The mixed air is then sent to condition the volume 102.

When the system 400 is operating in the second mode (the high altitude operation of the aircraft), the system 400 can operate in a similar way as in the low altitude operation, but for the dry cooled pressurized fresh air exiting the water extractor 151 being directed by the valve V1 to a mixing point M2. That is, the fresh air is mixed downstream of the condenser 162 and/or the turbine 415 rather than at it. Further, in the second mode, fresh air requirements can be met by mixing the bleed air with fresh air, while an amount of bleed air can reduced by 40% to 60% depending on an altitude. In this way, the system 400 provides the bleed air reduction ranging from 40% to 60% to provide higher efficiencies with respect to engine fuel burn than contemporary airplane air systems. Note that, in the second mode, the compressor 112 and fan 116 receive energy from the bleed air. The act of compressing the fresh air adds energy to the fresh air.

Turning now to FIGS. 5 and 6, variations of the above systems are shown as systems 500 and 600 according to non-limiting embodiments. Components of the above systems that are similar to the systems 500 and 600 have been reused for ease of explanation, by using the same identifiers, and are not re-introduced. Note that, in these systems 500 and 600, the compressing device 409 is divided into multiple components, so that the fan 116 can be located on a second shaft and driven by a mechanism other than the compressor 112.

With respect to FIG. 5, the system 500 is shown. Alternative and/or additional components of the system 500 include a compressing device 509 that comprises a component 510 and the component 216. The component 510 comprises the compressor 112, the turbine 413, and the turbine 415 on the same shaft 118. The component 216 comprises the turbine 217, the shaft 218, and the fan 219. The turbine 217 of the component 216 is configured to receive a flow of a first medium F1.2 (e.g., bleed air) from the inlet 101, so that energy of the flow of the first medium F1.2 can be extracted by the turbine 217 and drive the fan 219 via the shaft 218.

When the system 500 is operating in the first mode (the low altitude operation of the aircraft), the compressor 112 receives energy from a first flow of the first medium F1 via turbine 415 and energy from the second medium F2 (e.g., fresh air) via the turbine 413. The energy received by the compressor 112 is utilized to compress the second medium F2. The act of compressing the second medium F2 adds energy to the second medium F2 and that energy is also used to drive the compressor 112 in a bootstrapping effect. The fan 219 receives energy from the second flow of the first medium F1.2 passing through the turbine 217. Note that the pressure drop during the first mode between the inlet 101 and the exhaust of the turbine 215 can cause the second flow of the first medium F1.2 to be pulled through the turbine of the system 500.

When the system 500 is operating in the second mode (the high altitude operation of the aircraft), the compressor 112 receives energy from the first flow of the first medium F1 via turbine 415 to compress the second medium F2. The act of compressing the second medium F2 adds energy to the second medium F2.

Turning now to FIG. 6, the system 600 is shown. Components of the above systems that are similar to the system 600 have been reused for ease of explanation, by using the same identifiers, and are not re-introduced. Alternative and/or additional components of the system 600 include a compressing device 609 that comprises the component 510 and the component 316. The component 510 comprises the compressor 112, the turbine 413, and the turbine 415 on the same shaft 118. The component 316 comprises the motor 317, the shaft 318, and the fan 319. The motor 317 of the component 316 can be configured to receive electric power, which enables the motor 316 to drive the fan 319 via the shaft 318.

When the system 600 is operating in the first mode (the low altitude operation of the aircraft), the compressor 112 receives energy from a first flow of the first medium F1 via turbine 415 and energy from the second medium F2 (e.g., fresh air) via the turbine 413. The energy received by the compressor 112 is utilized to compress the second medium F2. The act of compressing the second medium F2 adds energy to the second medium F2 and that energy is also used to drive the compressor 112 in a bootstrapping effect. The fan 319 is driven by the motor 317.

When the system 600 is operating in the second mode (the high altitude operation of the aircraft), the compressor 112 receives energy from the first flow of the first medium F1 via turbine 415 to compress the second medium F2. The act of compressing the second medium F2 adds energy to the second medium F2.

Figure 7:
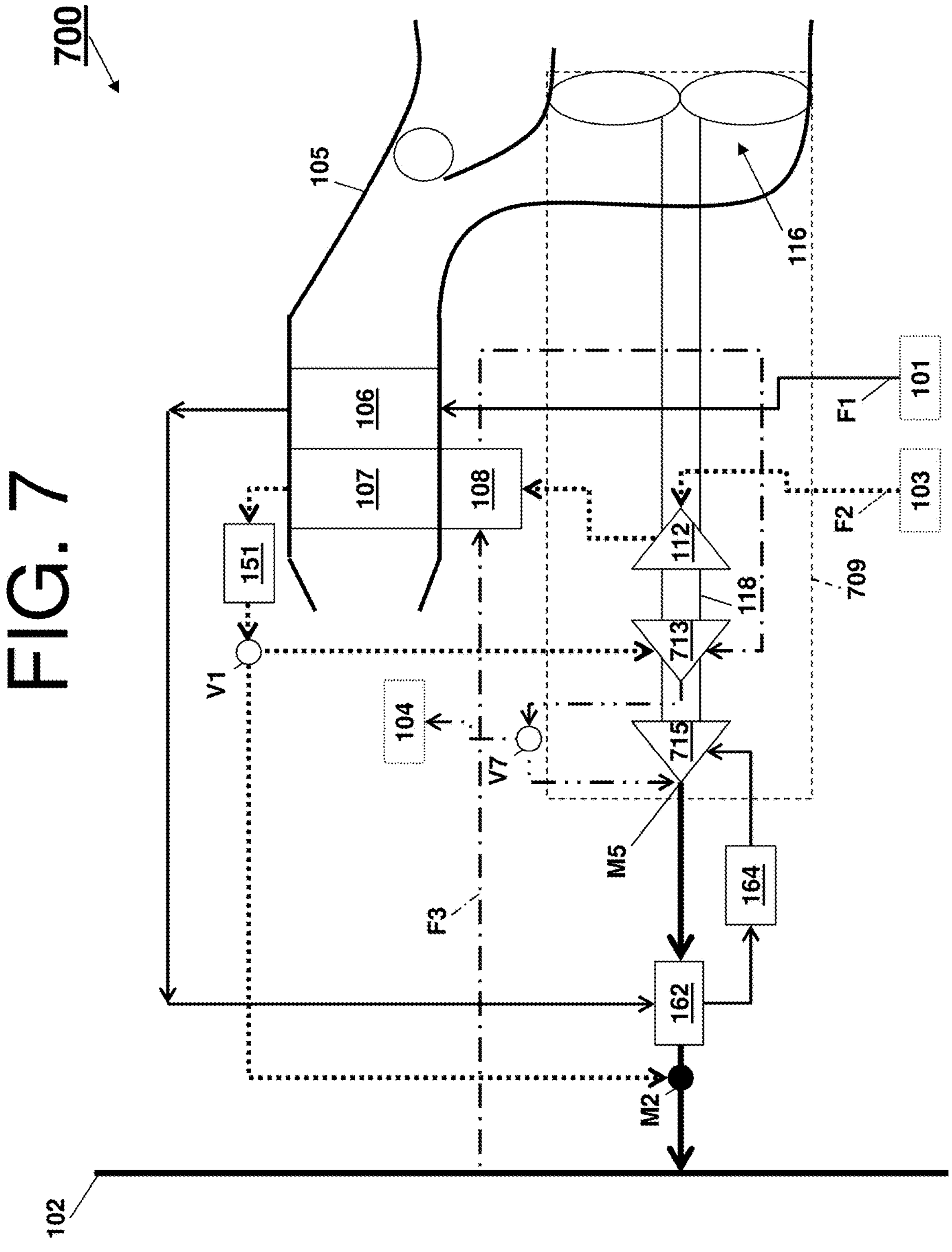
FIG. 7 is a diagram of a schematic of an environmental control system according to another embodiment.
Figure 8:
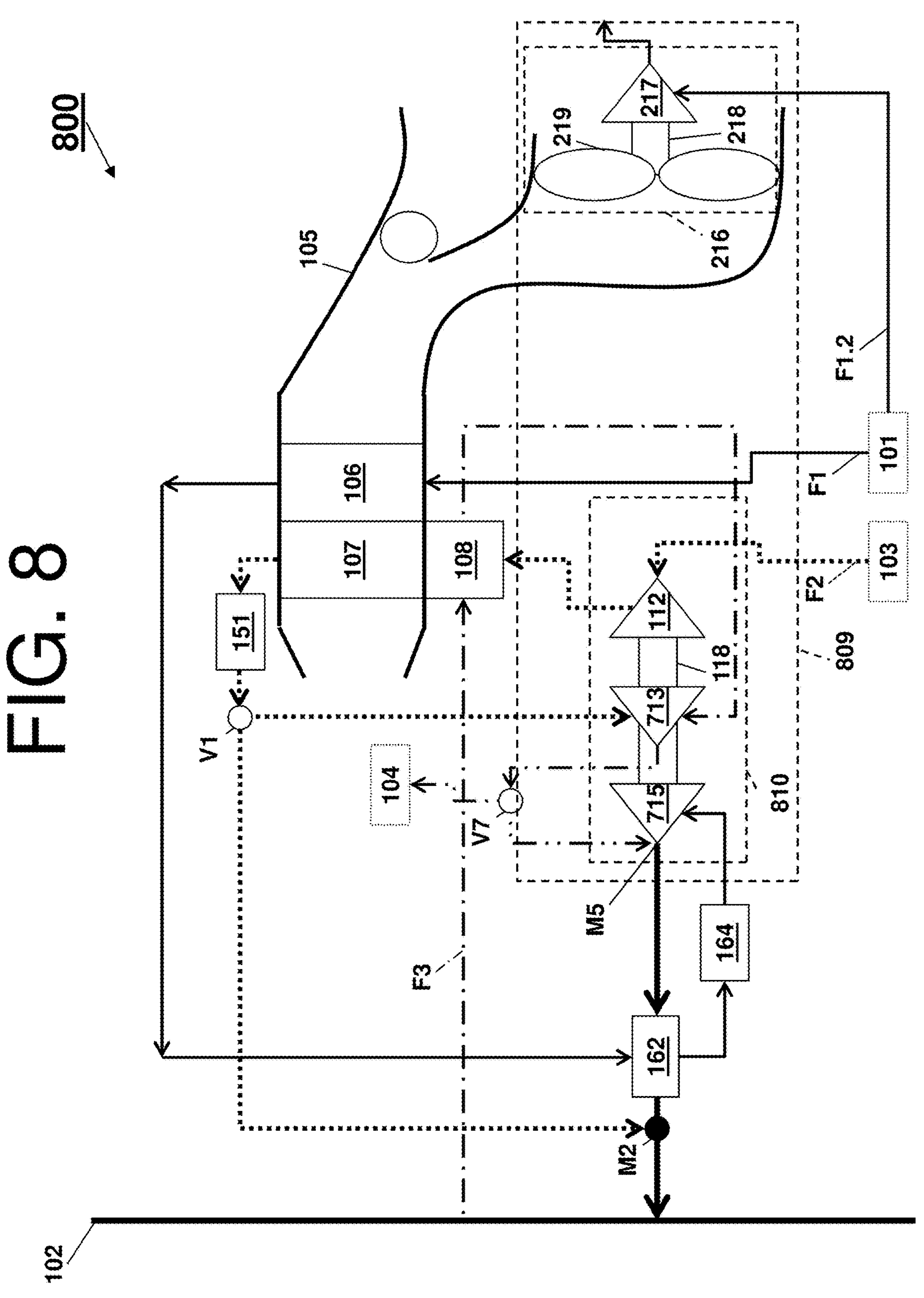
FIG. 8 is a diagram of a schematic of an environmental control system according to another embodiment.
Figure 9:
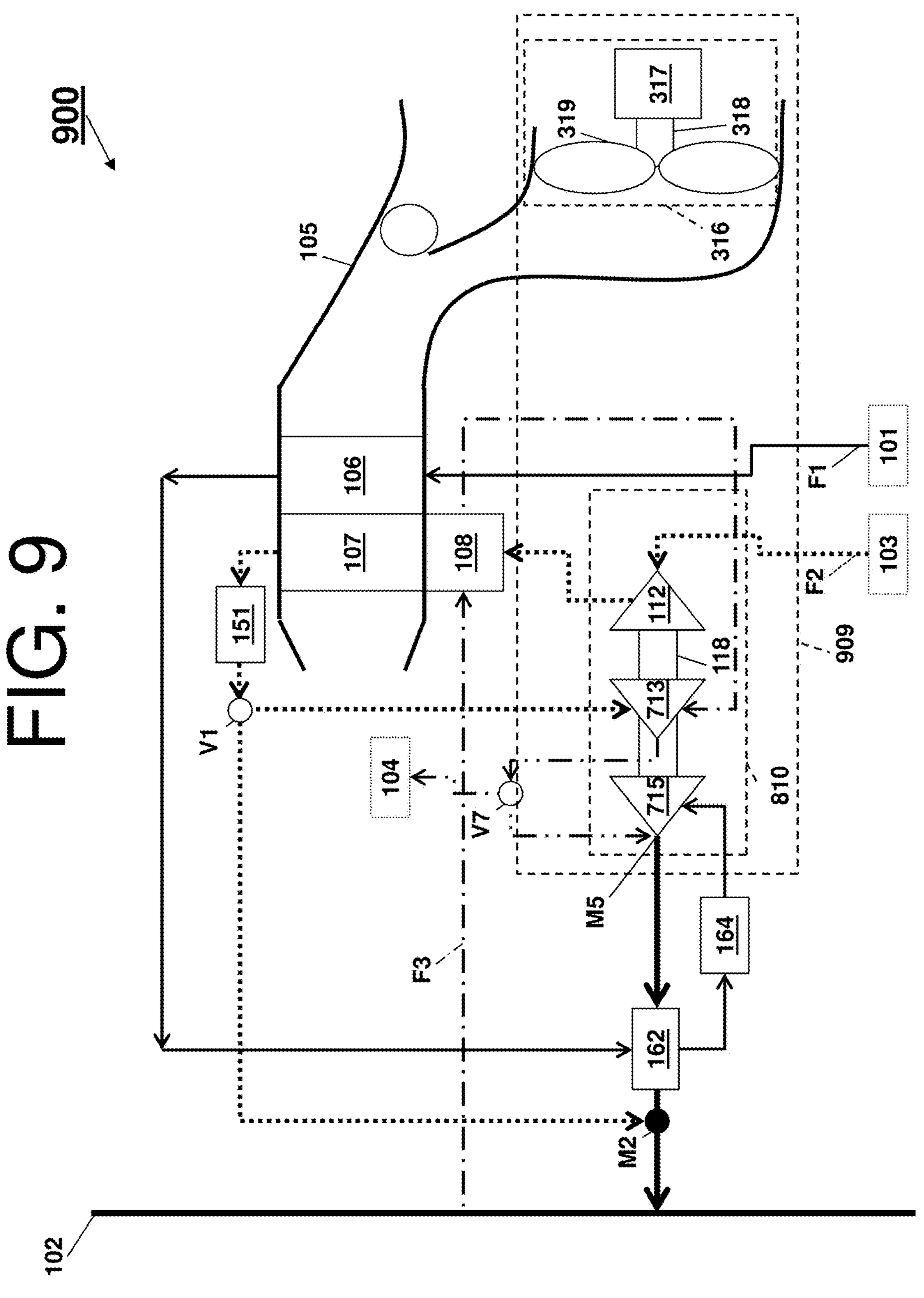
FIG. 9 is a diagram of a schematic of an environmental control system according to another embodiment.

Turning now to FIGS. 7, 8, and 9, variations of the above systems are shown as systems 700, 800, and 900 according to non-limiting embodiments. Components of the above systems that are similar to the systems 700, 800, and 900 600 have been reused for ease of explanation, by using the same identifiers, and are not re-introduced.

With respect to the system 700 of FIG. 7, alternative and/or additional components of the system 700 include a compressing device 709 that additionally comprises a (dual use) turbine 713 and a turbine 715, along with mixing point M5. Note that turbine 713 is a duel entry turbine, that the mixing point M5 is downstream of the heat exchangers 106 and 107, and that the third medium F3 can be supplied to an inlet of the ram circuit based on the operation of a valve v7. The exhaust of the turbine 713 can be controlled a valve V7, such that the flow of can be directed to an outlet 104 (into the ram circuit) or mixed at the turbine 715 (mixing point M5).

When the system 700 is operating in the first mode (the low altitude operation of the aircraft), the compressor 112 and the fan 116 receive energy from the first medium F1 via turbine 715 and energy from the second medium F2 via the turbine 713. The energy received by the compressor 112 is utilized to compress the second medium F2. The act of compressing the second medium F2 adds energy to the second medium F2 and that energy is also used to drive the compressor 112, in a bootstrapping effect, and the fan 116. Note that the second medium F2 and the first medium F1 can mix at the turbine 715 (mixing point M5).

When the system 700 is operating in the second mode (the high altitude operation of the aircraft), the compressor 112 and the fan 116 receive energy from the first medium F1 via turbine 715 and energy from the third medium F3 via the turbine 713. The energy received by the compressor 112 is utilized to compress the second medium F2. Note that the second medium F2 and the first medium F1 can mix downstream of the turbine 715 (e.g., at mixing point M2). Note that the third medium F3 is directed by valve V7 to outlet 104.

Turning now to FIGS. 8 and 9, variations of the above systems are shown as systems 800 and 900 according to non-limiting embodiments. Components of the above systems that are similar to the systems 800 and 900 have been reused for ease of explanation, by using the same identifiers, and are not re-introduced. Note that, in these systems 800 and 900, the compressing device 709 is divided into multiple components, so that the fan 116 can be located on a second shaft and driven by a mechanism other than the compressor 112.

With respect to FIG. 8, the system 800 is shown. Alternative and/or additional components of the system 800 include a compressing device 809 that comprises a component 810 and the component 216. The component 810 comprises the compressor 112, the turbine 713, and the turbine 715 on the same shaft 118. The component 216 comprises the turbine 217, the shaft 218, and the fan 219. The turbine 217 of the component 216 is configured to receive a flow of a first medium F1.2 (e.g., bleed air) from the inlet 101, so that energy of the flow of the first medium F1.2 can be extracted by the turbine 217 and drive the fan 219 via the shaft 218.

When the system 800 is operating in the first mode (the low altitude operation of the aircraft), the compressor 112 receives energy from the first medium F1 via turbine 715 and energy from the second medium F2 via the turbine 713. The energy received by the compressor 112 is utilized to compress the second medium F2. The act of compressing the second medium F2 adds energy to the second medium F2 and that energy is also used to drive the compressor 112, in a bootstrapping effect. Note that the second medium F2 and the first medium F1 can mix at the turbine 715 (mixing point M5). The fan 219 receives energy from the second flow of the first medium F1.2 passing through the turbine 217. Note that the pressure drop during the first mode between the inlet 101 and the exhaust of the turbine 215 can cause the second flow of the first medium F1.2 to be pulled through the turbine of the system 700.

When the system 800 is operating in the second mode (the high altitude operation of the aircraft), the compressor 112 receives energy from the first medium F1 via turbine 715 and energy from the third medium F3 via the turbine 713. The energy received by the compressor 112 is utilized to compress the second medium F2. Note that the second medium F2 and the first medium F1 can mix downstream of the turbine 715 (e.g., at mixing point M2). Note that the third medium F3 is directed by valve V7 to outlet 104.

With respect to the system 900 of FIG. 9, alternative and/or additional components of the system 900 include a compressing device 909 that comprises the component 810 and the component 316. The component 810 comprises the compressor 112, the turbine 713, and the turbine 715 on the same shaft 118. The component 316 comprises the motor 317, the shaft 318, and the fan 319. The motor 317 of the component 316 can be configured to receive electric power, which enables the motor 316 to drive the fan 319 via the shaft 318.

When the system 900 is operating in the first mode (the low altitude operation of the aircraft), the compressor 112 receives energy from the first medium F1 via turbine 715 and energy from the second medium F2 via the turbine 713. The energy received by the compressor 112 is utilized to compress the second medium F2. The act of compressing the second medium F2 adds energy to the second medium F2 and that energy is also used to drive the compressor 112, in a bootstrapping effect. Note that the second medium F2 and the first medium F1 can mix at the turbine 715 (mixing point M5). The fan 319 is driven by the motor 317.

When the system 900 is operating in the second mode (the high altitude operation of the aircraft), the compressor 112 receive energy from the first medium F1 via turbine 715 and energy from the third medium F3 via the turbine 713. The energy received by the compressor 112 is utilized to compress the second medium F2. Note that the second medium F2 and the first medium F1 can mix downstream of the turbine 715 (e.g., at mixing point M2). Note that the third medium F3 is directed by valve V7 to outlet 104.

Figure 10:
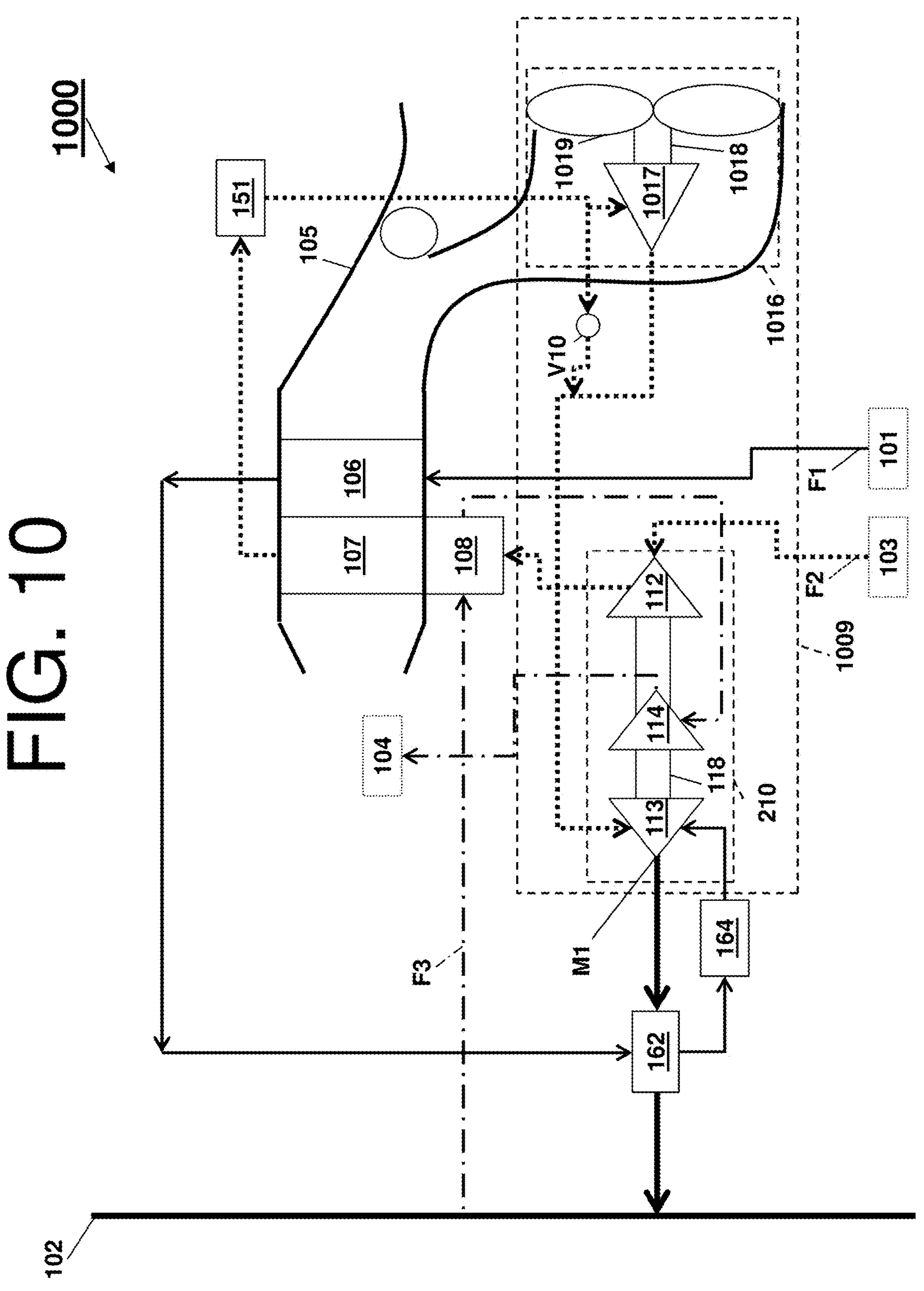
FIG. 10 is a diagram of a schematic of an environmental control system according to another embodiment.

Turning now to FIG. 10, a variation of the above systems is shown as system 1000 according to non-limiting embodiments. Components of the above systems that are similar to the systems 1000 have been reused for ease of explanation, by using the same identifiers, and are not re-introduced. Alternative and/or additional components of the system 1000 include a compressing device 1009 that the component 210 (comprising the compressor 112, the turbine 113, and the power turbine 114 on the same shaft 118) and a component 1016 (comprising a turbine 1017, a shaft 1-18, and a fan 1019). In general, the compressor 112 can receive energy from the first medium F1 via the turbine 113 and the third medium F3 via the power turbine 114, and the fan 1019 can receive energy from the second medium F2. A valve V10 can be utilized to bypass the turbine 1017 according to a mode.

In low altitude operation the compressor, in the system 1000, receives energy from the first medium F1. The act of compressing the second medium F2 adds energy to the second medium F2 and that energy is used to drive the fan. When the system 1000 is operating in the first mode (the low altitude operation of the aircraft), the compressor 112 receives energy from the first medium F1. The operations by the turbine 1017 extracts energy from the second medium F2 and that energy is also used to drive the fan 1019.

When the system 1000 is operating in the second mode (the high altitude operation of the aircraft), the compressor 112 receives energy from the first medium F1. The act of compressing the second medium F2 adds energy to the second medium F2 but not enough to further drive the fan 1019. The compressor 112 can also receive energy from the third medium F3 via the power turbine 1015, which is used to increase an amount of the second medium F2 compressed in the compressor 112.

Figure 11:
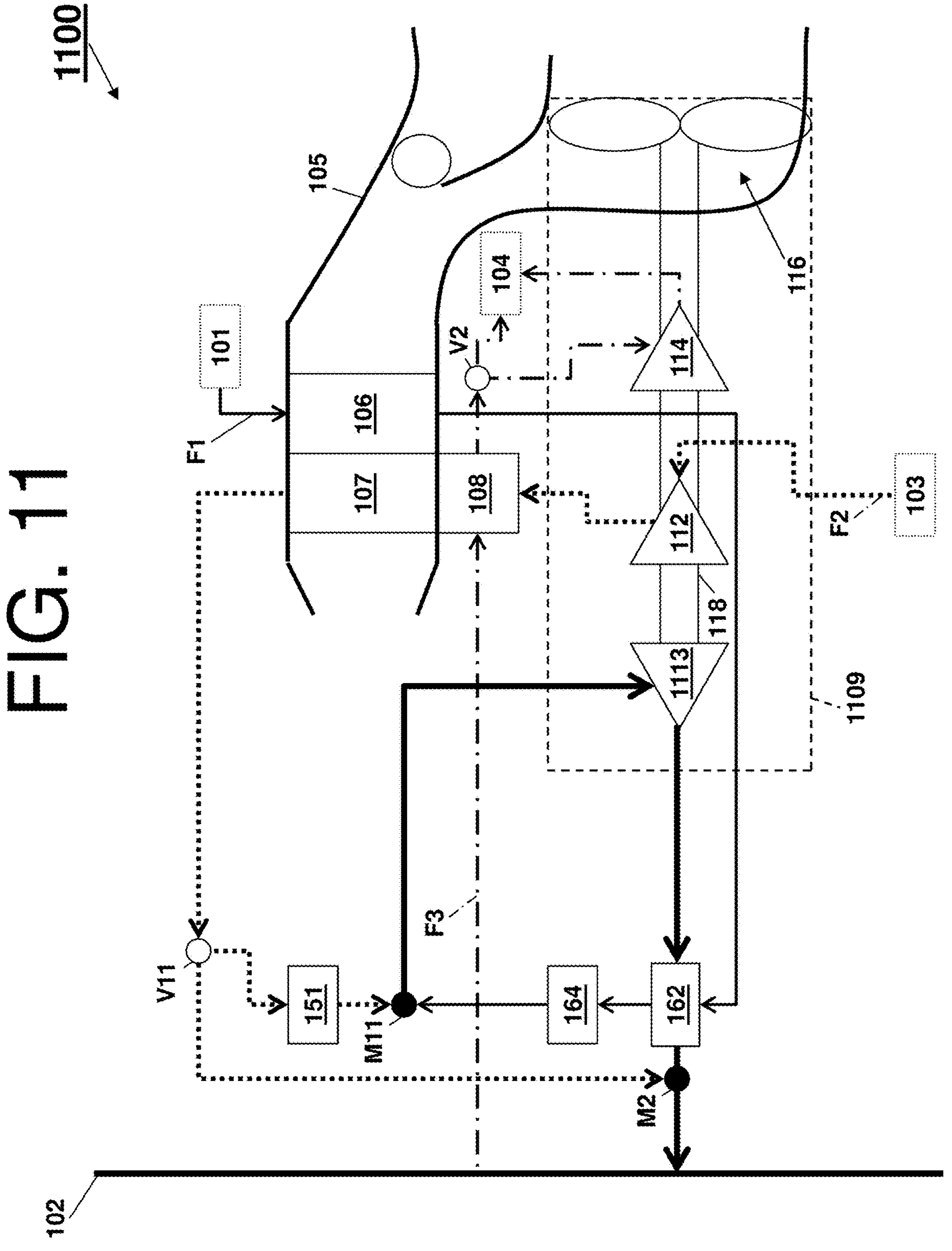
FIG. 11 is a diagram of a schematic of an environmental control system according to another embodiment.
Figure 12:
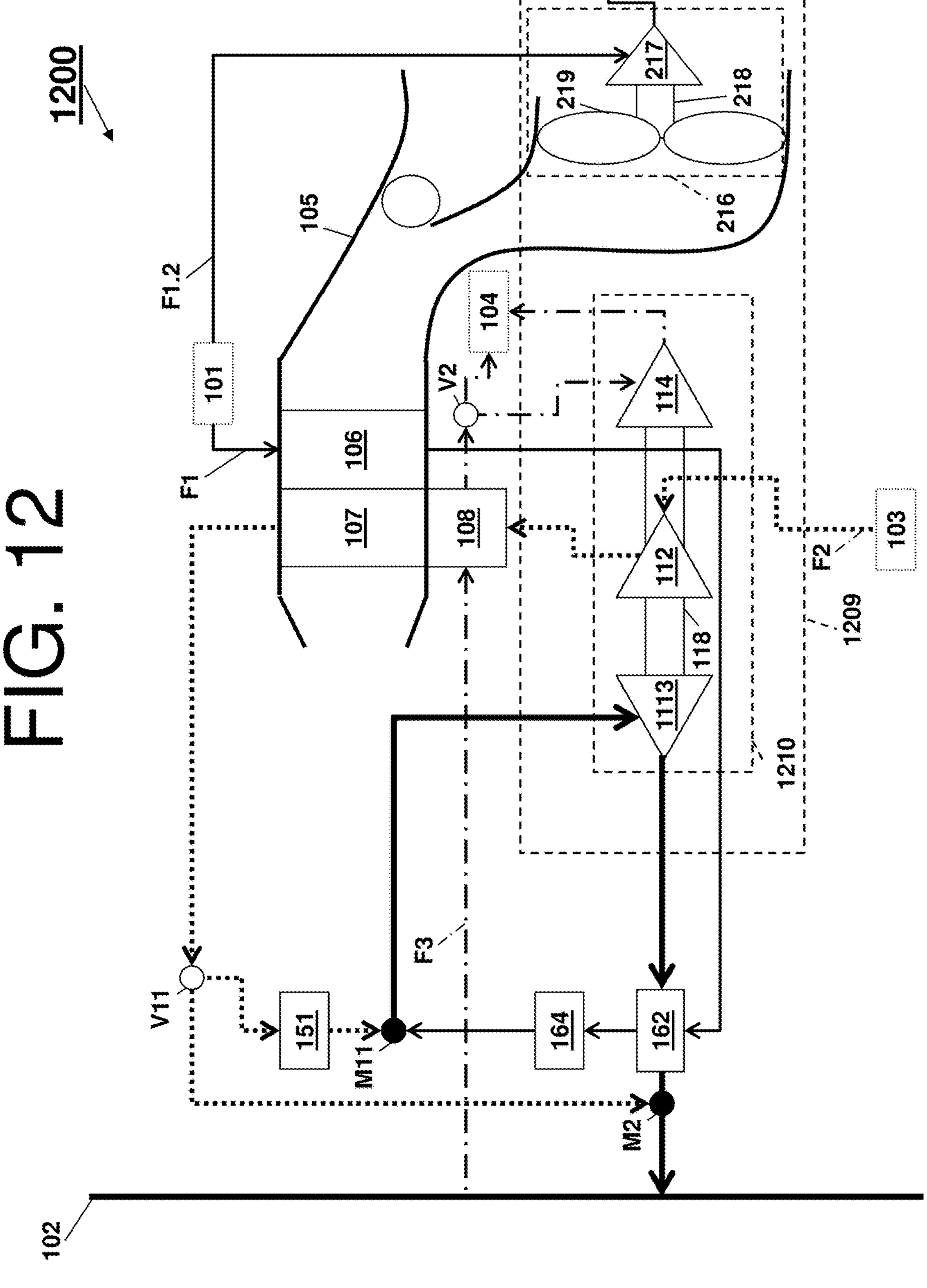
FIG. 12 is a diagram of a schematic of an environmental control system according to another embodiment.
Figure 13:
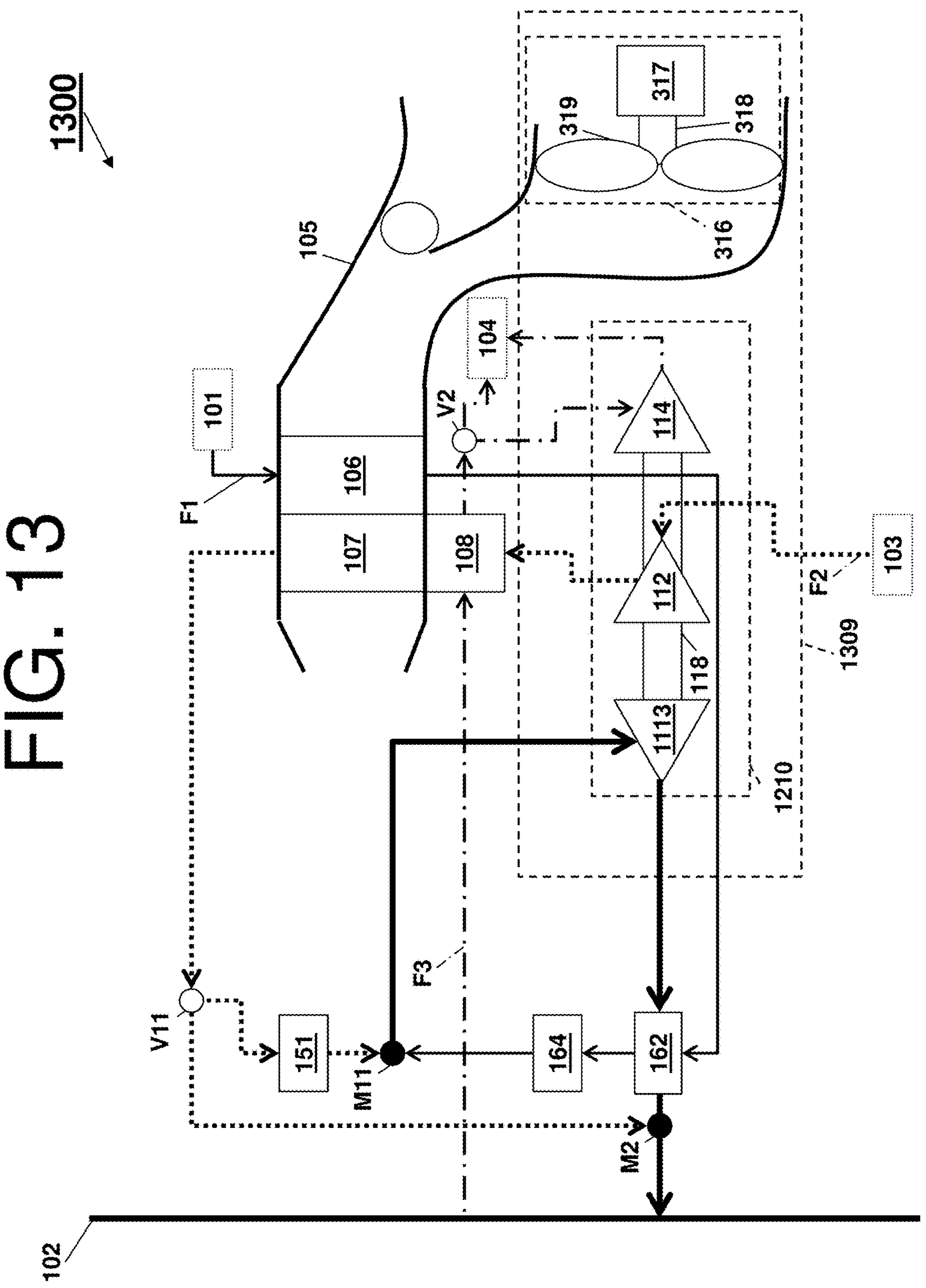
FIG. 13 is a diagram of a schematic of an environmental control system according to another embodiment.

Turning now to FIGS. 11, 12, and 13, variations of the above systems are shown as systems 1100, 1200, and 1300 according to non-limiting embodiments. Components of the above systems that are similar to the systems 1100, 1200, and 1300 have been reused for ease of explanation, by using the same identifiers, and are not re-introduced.

With respect to the system 1100 of FIG. 11, alternative and/or additional components of the system 1100 include a compressing device 1109 that comprises a turbine 1113, along with mixing point M11 and a valve V11. Note that the mixing point M11 is downstream of the heat exchangers 106 and 107 and upstream of the turbine 1113. The exhaust of the secondary heat exchanger 107 can be controlled a valve V11, such that the flow of can be directed to the volume 102 (mixing point M2) or the turbine 1113 (via mixing point M11).

When the system 1100 is operating in the first mode (the low altitude operation of the aircraft), the compressor 112 receives energy from the mixed air via turbine 1113 to compress the fresh air. The act of compressing the fresh air adds energy to the fresh air and that energy is also used to drive the compressor 112, in a bootstrapping effect, and the fan 116. Note that, in the first mode, the valve V2 directs the cabin discharge air to bypass the power turbine 114 and flow to the outlet 104, as the additional energy is not needed for compression.

For example, in the first mode, high-pressure high-temperature bleed air from either then the engine or the auxiliary power unit (e.g., the inlet 101) enters the primary heat exchanger 106. The primary heat exchanger 106 cools the high-pressure high-temperature bleed air to nearly ambient temperature to produce cool high-pressure bleed air. The cool high-pressure bleed air enters the condenser 162, where it is cooled (and dehumidified) to produce cold high-pressure bleed air. Note that the heat sink used by the condenser 162 can be the mixed air exhausting from the turbine 1113 of the compressing device 109. The cold high-pressure bleed air flows through the water extractor 164, where moisture can be removed to produce cold dry high-pressure bleed air. Note that the combination of the condenser 162 and the water extractor 164 can be considered a high-pressure water extractor because bleed air received by the condenser 162 is at the highest pressure in the system 1100. The cold dry high-pressure bleed air is mixed with an exhaust of the water extractor 151 to produce mixed air. The mixed air enters the turbine 1113, where it is expanded and work extracted.

The work extracted by the turbine 1113 drives the compressor 112 used to compress the fresh air and drives the fan 116 used to move ram air through the ram air heat exchangers (e.g., the primary heat exchanger 106 and the secondary heat exchanger 107). The act of compressing the fresh air heats (and compresses) it to produce compressed fresh air, which is at nearly the same pressure as the bleed air. The pressurized fresh air enters the outflow heat exchanger 108 and is cooled by the cabin discharge air to produce cooled pressurized fresh air. The cooled pressurized fresh air enters the secondary heat exchanger 107, where it is further cooled to nearly ambient temperature to produce cool pressurized fresh air. The cool pressurized fresh air is then directed by the valve V1 to the water extractor 151 where any free moisture in the cool pressurized fresh air is removed to produce dry cool pressurized fresh air. This dry cool pressurized fresh air is mixed with an exhaust of the water extractor 164 to produce the mixed air. The mixed air enters the turbine 1113, where it is expanded and work extracted.

The two air flows (i.e., the fresh air from the water extractor 151 and the bleed air from the water extractor 164) are mixed downstream of the turbine 1113 (e.g., at mixing point M11 as shown) to produce the mixed air. The mixed air leaves the turbine 1113 and enters the condenser 162 (to cool the cool high-pressure bleed air leaving the primary heat exchanger 106 in the condenser 162). The mixed air is then sent to condition the volume 102.

When the system 1100 is operating in the second mode (the high altitude operation of the aircraft), the system 1100 can operate in a similar way as in the low altitude operation. For instance, the compressor 112 receives energy from the bleed air via turbine 1113 to compress the fresh air. The act of compressing the fresh air adds energy to the fresh air. However, this energy is not enough to further drive the compressor 112. The compressor 112 then also receives energy from the cabin discharge air via the power turbine 114 (the valve V2 directs the third medium F3 to the power turbine 114), which used to increase an amount of the fresh air compressed in the compressor 112. Further, the dry cool pressurized fresh air exiting the water extractor 151 is also directed by the valve V11 to a mixing point M2 so that the fresh air is mixed downstream of the turbine 1113 (rather than at it). Furthermore, in the second mode, fresh air requirements can be met by mixing the bleed air with fresh air, while an amount of bleed air can reduced by 40% to 60% depending on an altitude. In this way, the system 100 provides the bleed air reduction ranging from 40% to 60% to provide higher efficiencies with respect to engine fuel burn than contemporary airplane air systems.

Turning now to FIGS. 12 and 13, variations of the above system are shown as systems 1200 and 1300 according to non-limiting embodiments. Components of the above system that are similar to the systems 1200 and 1300 have been reused for ease of explanation, by using the same identifiers, and are not re-introduced. Note that, in these systems 1200 and 1300, the compressing device 1109 is divided into multiple components, so that the fan 116 can be located on a second shaft and driven by a mechanism other than the compressor 112.

Turning now to FIG. 12, the system 1200 is shown. Alternative and/or additional components of the system 200 include a compressing device 1209 that comprises a component 1210 and a component 216. The component 1210 comprises the compressor 112, the turbine 1113, and the power turbine 114 on the same shaft 118. The component 216 comprises the turbine 217, the shaft 218, and the fan 219. The turbine 217 of the component 216 is configured to receive a flow of a first medium F1.2 (e.g., bleed air) from the inlet 101, so that energy of the flow of the first medium F1.2 can be extracted by the turbine 217 and drive the fan 219 via the shaft 218.

When the system 1200 is operating in the first mode (the low altitude operation of the aircraft), the compressor 112 receives energy from the mixed air via turbine 1113 to compress the second medium F2 (e.g., fresh air). The act of compressing the second medium F2 adds energy to the second medium F2 and that energy is also used to drive the compressor 112 in a bootstrapping effect. The fan 219 receives energy from the second flow of the first medium F1.2 passing through the turbine 215. Note that the pressure drop during the first mode between the inlet 101 and the exhaust of the turbine 215 can cause the second flow of the first medium F1.2 to be pulled through the turbine of the system 1200.

When the system 1200 is operating in the second mode (the high altitude operation of the aircraft), the compressor 112 receives energy from the first medium F1 via turbine 1113 to compress the second medium F2. The act of compressing the second medium F2 adds energy to the second medium F2; however, this energy is not enough to further drive the compressor 112. The compressor 112 then also receives energy from the third medium F3 via the power turbine 114 (the valve V2 directs the third medium F3 to the power turbine 114), which is used to increase an amount of the second medium F2 compressed in the compressor 112.

Turning now to FIG. 13, the system 1300 is shown. Alternative and/or additional components of the system 1300 include a compressing device 1309 that comprises the component 1210 and the component 316. The component 1210 comprises the compressor 112, the turbine 1113, and the power turbine 114 on the same shaft 118. The component 316 comprises the motor 317, the shaft 318, and the fan 319. The motor 317 of the component 316 can be configured to receive electric power, which enables the motor 316 to drive the fan 319 via the shaft 318.

When the system 1300 is operating in the first mode (the low altitude operation of the aircraft), the compressor 112 receives energy from the mixed air via turbine 1113 to compress the second medium F2. The act of compressing the second medium F2 adds energy to the second medium F2 and that energy is also used to drive the compressor 112 in a bootstrapping effect. The fan 319 is driven by the motor 317.

When the system 1300 is operating in the second mode (the high altitude operation of the aircraft), the compressor 112 receives energy from the first flow of the first medium F1 via turbine 1113 to compress the second medium F2. The act of compressing the second medium F2 adds energy to the second medium F2; however, this energy is not enough to further drive the compressor 112. The compressor 112 then also receive energy from the third medium F3 via the power turbine 114 (the valve V2 directs the third medium F3 to the power turbine 114), which is used to increase an amount of the second medium F2 compressed in the compressor 112.

Aspects of the embodiments are described herein with reference to flowchart illustrations, schematics, and/or block diagrams of methods, apparatus, and/or systems according to embodiments. Further, the descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The flow diagrams depicted herein are just one example. There may be many variations to this diagram or the steps (or operations) described therein without departing from the spirit of embodiments herein. For instance, the steps may be performed in a differing order or steps may be added, deleted or modified. All of these variations are considered a part of the claims.

While the preferred embodiment has been described, it will be understood that those skilled in the art, both now and in the future, may make various improvements and enhancements which fall within the scope of the claims which follow. These claims should be construed to maintain the proper protection.

What is claimed is:

1. A compressing device, comprising:

a first medium provided from a first source and a second medium provided from a second source;

a turbine comprising a at least one inlet, wherein the first medium is receivable at the at least one inlet, and a mixture of the first medium and the second medium is receivable at the at least one inlet, the first medium and the second medium being mixed to form the mixture at a location upstream from the at least one inlet, wherein the turbine is configured to provide a first energy by expanding the mixture and to provide a second energy by expanding the first medium;

a compressor configured to:

receive the first energy from the turbine during a first mode of the compressing device, receive the second energy from the first medium during a second mode of the compressing device, and compress the second medium in accordance with the first mode or the second mode.

2. The compressing device of claim 1, comprising:

a fan driven by the first energy during the first mode and the second energy during the second mode.

3. The compressing device of claim 1, comprising:

a power turbine configured to provide a third energy by expanding a third medium provided from a third source, wherein the compressor is configured to receive the third energy from the third medium expanded across the power turbine.

4. The compressing device of claim 1, comprising:

a first component comprising the turbine and the compressor; and a second component, which is separate from the first component, comprising a fan, a second turbine, and a shaft.

5. The compressing device of claim 4, wherein the fan is driven via the shaft by the first medium expanding across the second turbine.

6. The compressing device of claim 1, comprising:

a first component comprising the turbine and the compressor; and a second component, which is separate from the first component, comprising a fan driven by a motor.

* * * * *